US011738425B2

(12) United States Patent
Borowicz

(10) Patent No.: US 11,738,425 B2
(45) Date of Patent: Aug. 29, 2023

(54) ADAPTIVE TOOLING ASSEMBLY

(71) Applicant: The Boeing Company, Chicago, IL (US)

(72) Inventor: Clifford D. Borowicz, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 16/822,291

(22) Filed: Mar. 18, 2020

(65) Prior Publication Data

US 2021/0292105 A1 Sep. 23, 2021

(51) Int. Cl.
*B25B 11/00* (2006.01)
*B23Q 3/18* (2006.01)
*B23Q 15/22* (2006.01)
*B23Q 3/08* (2006.01)
*B25J 15/00* (2006.01)

(52) U.S. Cl.
CPC .......... *B25B 11/005* (2013.01); *B23Q 3/088* (2013.01); *B23Q 3/183* (2013.01); *B23Q 15/22* (2013.01); *B25J 15/0052* (2013.01)

(58) Field of Classification Search
CPC ... B25B 11/005; B23Q 17/2291; B23Q 3/088; B23Q 1/037
See application file for complete search history.

(56) References Cited

U.S. PATENT DOCUMENTS

| 3,166,202 A | * | 1/1965 | Arnold | B65G 47/91 |
| | | | | 294/65 |
| 4,609,002 A | * | 9/1986 | Noh | B23P 19/06 |
| | | | | 134/76 |
| 4,806,070 A | * | 2/1989 | Poux | B65G 47/917 |
| | | | | 198/750.12 |
| 4,821,393 A | * | 4/1989 | Spigarelli | B25B 5/06 |
| | | | | 29/283 |

(Continued)

FOREIGN PATENT DOCUMENTS

| CN | 105382741 B | * | 4/2017 | |
| CN | 108942327 A | * | 12/2018 | ............. B23Q 3/064 |

(Continued)

OTHER PUBLICATIONS

EP-2246150-A2 Machine Translation (Year: 2010).*

(Continued)

*Primary Examiner* — Michael W Hotchkiss
(74) *Attorney, Agent, or Firm* — Duft & Bornsen, PC

(57) ABSTRACT

A fixture and a method of operating the fixture are disclosed for repositioning a workpiece disposed on the fixture to correct an offset between the centerline of the workpiece and an indexing position on the fixture. The fixture includes one or more linear actuators that linearly move vacuum grippers on their outboard ends into contact with surfaces of the workpiece. Vacuum is applied to the vacuum grippers, which enables the vacuum grippers to grip the surfaces of the workpiece. The linear actuators are driven to reposition the workpiece on the fixture to reduce the offset between the (Continued)

two below a threshold value. When in position, the fixture secures the workpiece in place for subsequent machining operations that may be performed on the workpiece.

22 Claims, 26 Drawing Sheets

(56) References Cited

U.S. PATENT DOCUMENTS

| | | | | |
|---|---|---|---|---|
| 5,163,793 | A * | 11/1992 | Martinez | B23Q 1/037 |
| | | | | 409/219 |
| 5,213,348 | A * | 5/1993 | Crossman | B23Q 17/2291 |
| | | | | 82/170 |
| 6,121,781 | A * | 9/2000 | Martinez | B25B 11/005 |
| | | | | 324/661 |
| 6,463,644 | B1 * | 10/2002 | Pasque | B62D 65/026 |
| | | | | 269/21 |
| 6,519,861 | B1 * | 2/2003 | Brueck | B23Q 3/183 |
| | | | | 82/170 |
| 6,543,973 | B2 * | 4/2003 | Lapikas | B23Q 16/001 |
| | | | | 451/406 |
| 8,322,700 | B2 * | 12/2012 | Saberton | B25B 11/005 |
| | | | | 29/559 |
| 8,550,470 | B2 * | 10/2013 | Amano | B23Q 3/15 |
| | | | | 414/781 |
| 8,695,958 | B2 * | 4/2014 | Marrinan | G05B 19/404 |
| | | | | 29/468 |
| 8,857,877 | B2 * | 10/2014 | Lin | B25J 15/0052 |
| | | | | 901/14 |
| 8,894,055 | B2 * | 11/2014 | Marrinan | B23Q 3/16 |
| | | | | 269/140 |
| 8,944,423 | B2 * | 2/2015 | Marrinan | G05B 19/4097 |
| | | | | 269/21 |
| 9,440,321 | B2 * | 9/2016 | Susnjara | B23Q 3/18 |
| 9,475,126 | B2 * | 10/2016 | Fujiwara | B23B 31/101 |
| 9,498,887 | B1 * | 11/2016 | Zevenbergen | B25J 15/0616 |
| 9,512,864 | B2 * | 12/2016 | Gamboa | B23Q 9/0042 |
| 10,011,022 | B1 * | 7/2018 | Lin | B25J 15/0061 |
| 10,011,023 | B1 * | 7/2018 | Lin | B25J 15/0061 |
| 11,213,957 | B2 * | 1/2022 | Lin | B25J 15/0616 |
| 11,273,896 | B2 * | 3/2022 | Hirai | B64C 1/12 |
| 2008/0157487 | A1 * | 7/2008 | Hall | B23B 31/302 |
| | | | | 82/170 |
| 2010/0101298 | A1 * | 4/2010 | Carstensen | B21J 13/10 |
| | | | | 269/71 |
| 2010/0194009 | A1 * | 8/2010 | Fullwood | B25B 11/005 |
| | | | | 269/329 |
| 2015/0013145 | A1 * | 1/2015 | Fujiwara | B23B 31/101 |
| | | | | 29/559 |
| 2019/0247983 | A1 * | 8/2019 | Borowicz | B65G 47/917 |

FOREIGN PATENT DOCUMENTS

| | | | | |
|---|---|---|---|---|
| DE | 10144963 | A1 * | 3/2003 | B23Q 17/225 |
| EM | 2246150 | A2 * | 11/2010 | B23Q 1/037 |
| KR | 20190125845 | A * | 11/2019 | B23Q 1/46 |

OTHER PUBLICATIONS

DE-10144963-A1 Machine Translation (Year: 2003).*
CN-108942327-A Machine Translation (Year: 2018).*
CN-105382741-B Machine Translation (Year: 2017).*
KR20190125845A Machine Translation (Year: 2019).*

* cited by examiner

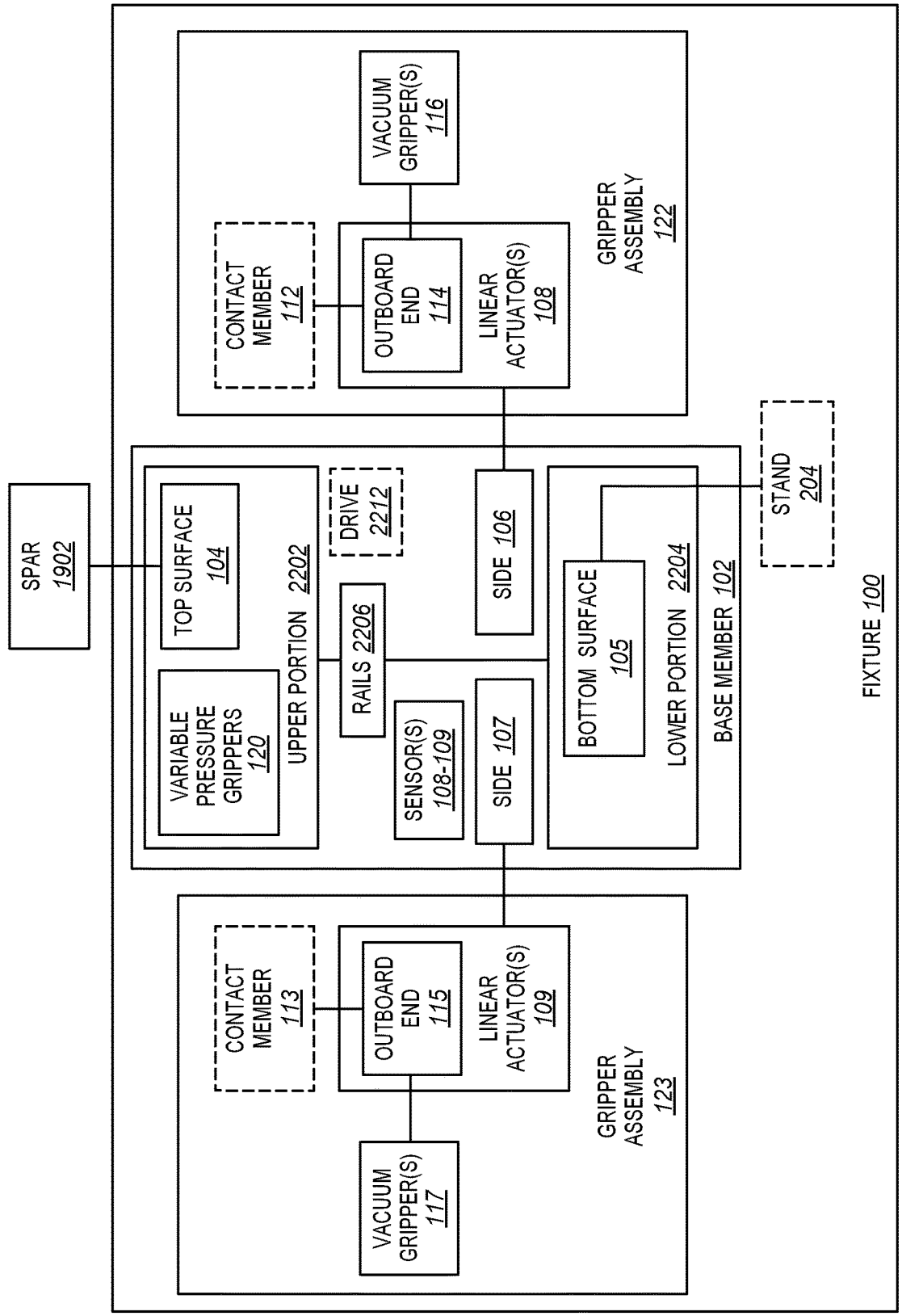

ADAPTIVE TOOLING ASSEMBLY

FIELD

This disclosure relates to the field of manufacturing, and in particular, to tooling fixtures that hold a workpiece during a machining process.

BACKGROUND

In manufacturing, a workpiece often undergoes various machining processes, such as cutting, boring, routing, etc. It is desirable to rigidly hold the workpiece in a fixed position during the machining operations to prevent vibration, chatter, and/or flexing of the workpiece in order to reduce the possibility of machining errors. Further, it is desirable to rigidly hold the workpiece in a fixed position without introducing a pre-load on the workpiece, which may also introduce machining errors during the machining operations. Further still, it is desirable to automate the alignment of the workpiece on the fixture to preclude a labor-intensive shimming process in order to correctly align the workpiece on the fixture. Thus, improvements in fixture designs are an ongoing goal in the art.

SUMMARY

A fixture and a method of operating the fixture are disclosed for repositioning a workpiece disposed on the fixture to correct an offset between the centerline of the workpiece and an indexing position on the fixture. The fixture includes one or more linear actuators that linearly move vacuum grippers on their outboard ends into contact with surfaces of the workpiece. Vacuum is applied to the vacuum grippers, which enables the vacuum grippers to grip the surfaces of the workpiece. The linear actuators are driven to reposition the workpiece on the fixture to reduce the offset between the two below a threshold value. When in position, the fixture secures the workpiece in place for subsequent machining operations that may be performed on the workpiece. Being semi-automatic in nature in its repositioning, the fixture replaces a time-consuming manual shimming process that would often be used to ensure the workpiece is properly positioned on the fixture prior to machining the workpiece. The fixture therefore supports, repositions, and secures the workpiece during a machining process, providing a technical benefit of improving the set-up time and labor typically used to machine workpieces.

One embodiment comprises a tooling fixture that includes a base member, a gripper assembly, and a controller. The gripper assembly includes a linear actuator coupled to a side of the base member and having an outboard end that is linearly movable by the linear actuator. The gripper assembly further includes a vacuum gripper located at the outboard end of the linear actuator and a sensor. The sensor measures a distance to a surface of a workpiece disposed on the base member. The controller calculates an offset between an indexing position on the base member and a centerline of the workpiece based on a distance to the surface of the workpiece. The controller moves the vacuum gripper relative to the side of the base member in contact with the surface of the workpiece utilizing the linear actuator. The controller applies a vacuum to the vacuum gripper to grip the surface of the workpiece, and repositions the workpiece on the base member using the linear actuator until the offset is less than a threshold value.

Another embodiment comprises a tooling system that includes a plurality of tooling fixtures and a controller. The tooling fixtures are disposed on a common indexing line and hold a workpiece along its length. Each of the tooling fixtures includes a base member and a gripper assembly. The gripper assembly includes a linear actuator coupled to a side of the base member that has an outboard end that is linearly movable by the linear actuator. The gripper assembly further includes a vacuum gripper located at the outboard end of the linear actuator and a sensor. The sensor measures a distance to a surface of a workpiece disposed on the base member. The controller calculates a deflection of a centerline of the workpiece with respect to the common indexing line on the tooling fixtures based on a plurality of distances measured by the sensors, operates the linear actuators to linearly move the vacuum grippers relative to the sides of the base members into contact with the surfaces of the workpiece, and reposition the workpiece on the base members utilizing the linear actuators until the deflection is less than a threshold value.

Another embodiment comprises a method of operating a tooling fixture. The method comprises loading a workpiece on a tooling fixture, wherein the tooling fixture comprises a base member, a linear actuator coupled to a side of the base member and having an outboard end that is linearly movable by the linear actuator, a vacuum gripper located at the outboard end, and a sensor located on the side of the base member that is configured to measure a distance to a surface of the workpiece disposed on the base member. The method further comprises calculating an offset between an indexing position on the base member and a centerline of the workpiece based on a distance measured to the surface of the workpiece utilizing the sensor. The method further comprises linearly moving the vacuum gripper relative to the side of the base member into contact with the surface of the workpiece utilizing the linear actuator and applying a vacuum to the vacuum gripper to grip the surface of the workpiece. The method further comprises repositioning the workpiece on the base member utilizing the linear actuator until the offset is less than a threshold value.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 27 is a block diagram of the fixture of FIGS. 21-26 in illustrative embodiments.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
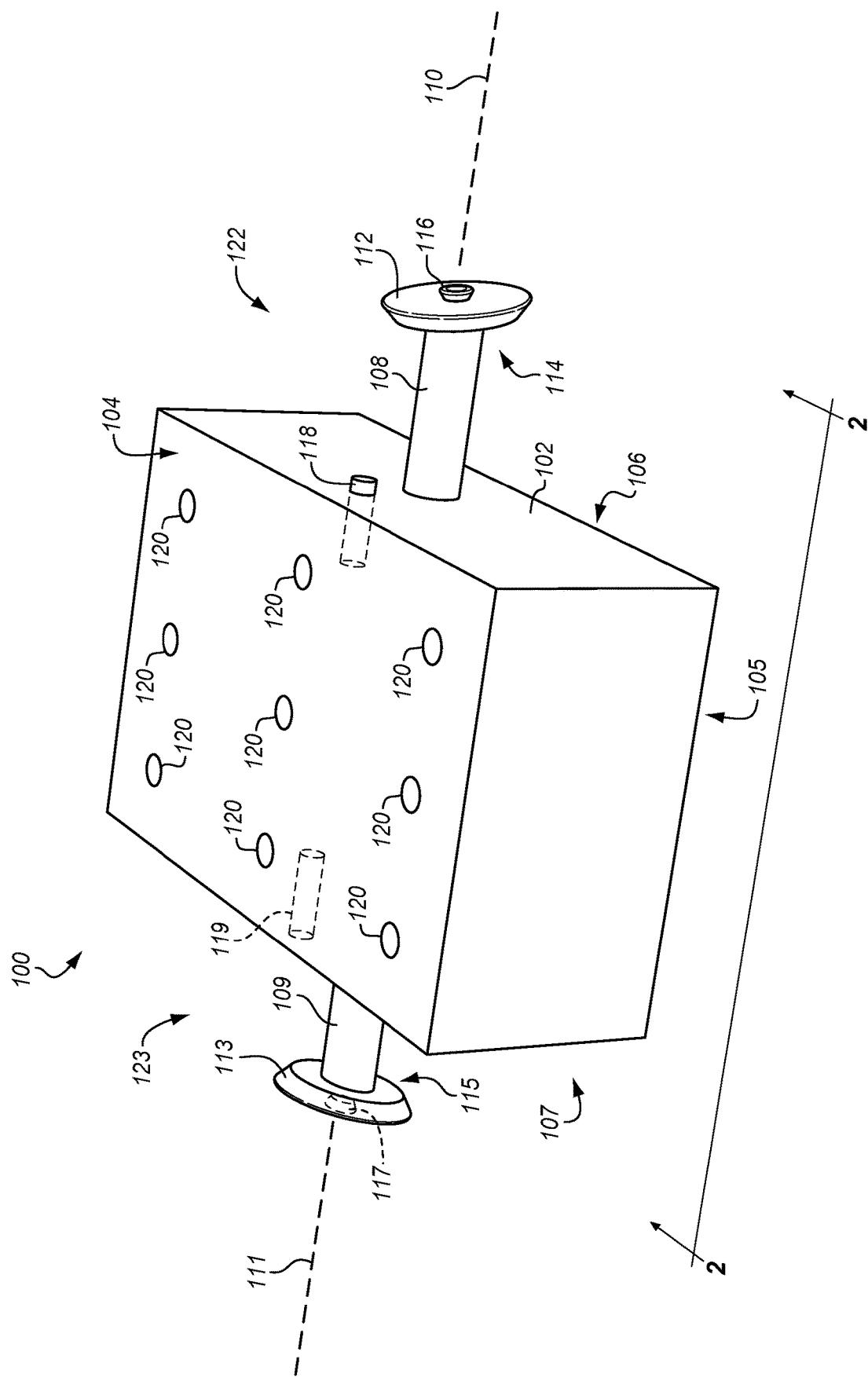
FIGS. 1-3 depict a fixture for supporting, repositioning, and securing a workpiece in place in illustrative embodiments.
Figure 2:
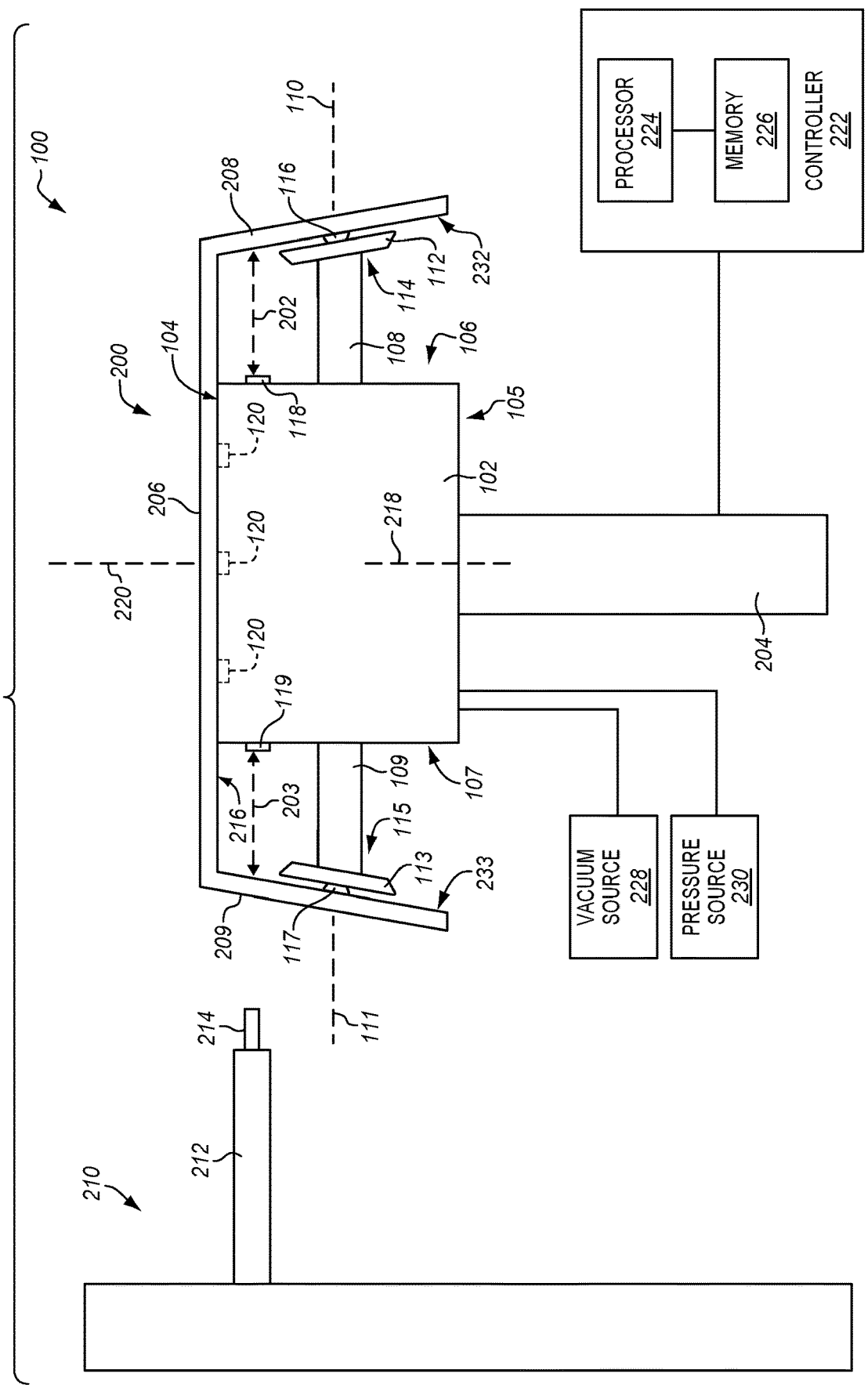
Figure 3:
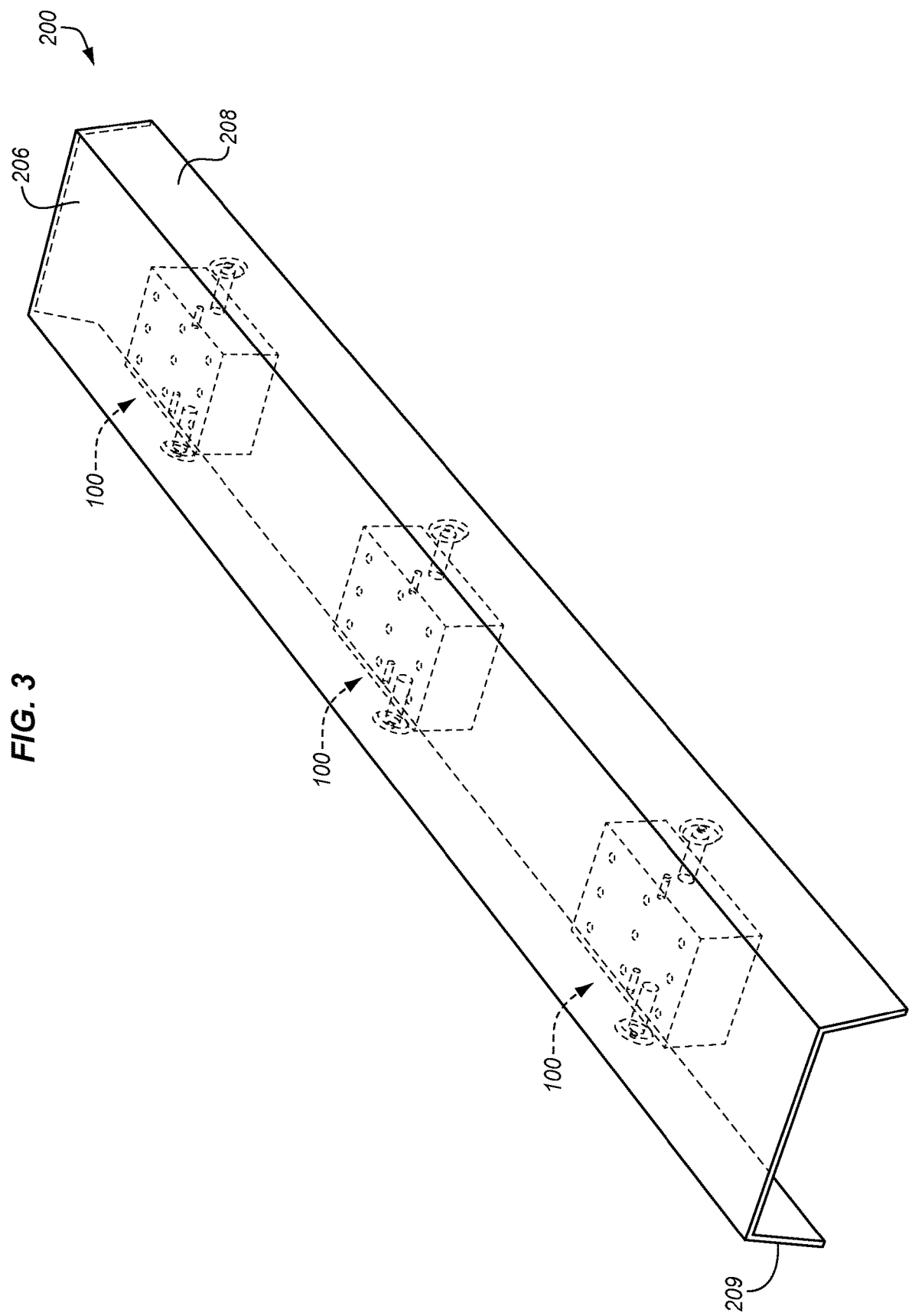

FIGS. 1-3 depict a tooling fixture 100 for supporting, repositioning, and securing a workpiece 200 in place in illustrative embodiments. In particular, FIG. 1 is an isometric view of fixture 100, FIG. 2 is a view of fixture 100 along view arrows 2-2, and FIG. 3 depicts a plurality of fixtures 100 used to hold workpiece 200. Generally, fixture 100 operates as a holding fixture or tooling fixture that supports workpiece 200 during one or more machining operations that may be performed on workpiece 200. Some examples of the machining operations that may be performed on workpiece 200 include cutting operations, drilling operations, grinding operations, boring operations, reaming operations, milling operations, reaming operations, etc.

In the embodiments described herein, workpiece 200 comprises any type of structure or component that may form part of a larger assembly. For example, workpiece 200 may comprise a component of an aircraft, such as a spar of a wing for the aircraft. Although workpiece 200 will be represented in the present disclosure as having a particular size, shape, and orientation, workpiece 200 may have a different size, shape, or orientation in other embodiments.

In this embodiment, fixture 100 includes a base member 102 having a top surface 104, a bottom surface 105 that opposes top surface 104, and sides 106-107 that oppose each other. Extending from sides 106-107 of base member 102 are a pair of linear actuators 108-109 that are configured to extend their respective outboard ends 114-115 towards and retract their respective outboard ends 114-115 away from sides 106-107 of base member 102. During operation of fixture 100, linear actuators 108-109 extend their outboard ends 114-115 away from sides 106-107 and contact surfaces of workpiece 200 in order to reposition workpiece 200 with respect to base member 102, and also to secure workpiece 200 in place on fixture 100. Fixture 100 is designed to support, reposition, and secure workpiece 200 in place during machining operations, while limiting the preload that may be applied to workpiece 200 in order to prevent machining errors.

Referring to FIGS. 1-2, linear actuator 108 extends and retracts outboard end 114 along axis 110 to move a contact member 112 located at outboard end 114 of linear actuator 108 either toward side 106 or away from side 106. Side 106 may be referred to as a first side in some embodiments. Located proximate to outboard end 114 of linear actuator 108 is a vacuum gripper 116, which is configured to apply a vacuum to surface 232 of workpiece 200 in order to secure workpiece 200 in place with respect to linear actuator 108. In like manner, linear actuator 109 extends and retracts its outboard end 115 along axis 111 to move a contact member 113 located at outboard end 115 of linear actuator 109 either toward side 107 or away from side 107. Side 107 may be referred to as a second side in some embodiments. Located proximate to outboard end 115 of linear actuator 109 is a vacuum gripper 117, which is configured to apply a vacuum to surface 233 of workpiece 200 in order to secure workpiece 200 in place with respect to linear actuator 109. Contact members 112-113 may have different shapes in other embodiments, or may be omitted in some embodiments. Further, axis 110-111 may be coincident in some embodiments or offset from each other. Collectively, linear actuator 108, contact member 112, and vacuum gripper 116 comprises a gripper assembly 122 (e.g., a first gripper assembly in some embodiments). Collectively, linear actuator 109, contact member 113, and vacuum gripper 117 comprises a gripper assembly 123 (e.g., a second gripper assembly in some embodiments).

During operation of fixture 100, a pair of sensors 118-119 (see FIG. 2) measures distances to surfaces 232-233 of workpiece 200 while linear actuators 108-109 translate vacuum grippers 116-117 towards/away from surfaces 232-233. With regard to FIG. 2, sensor 118 measures a distance 202 to a flange 208 of workpiece 200 and sensor 119 measures a distance 203 to a flange 209 of workpiece 200.

In some embodiments, fixture 100 includes one or more variable pressure grippers 120 (see FIG. 1), which may apply a vacuum and/or a pressure to surface 216 of workpiece 200 that is in contact with top surface 104 of base member 102. For example, during operation of fixture 100, variable pressure grippers 120 may apply a vacuum to surface 216 of workpiece 200 (e.g., using vacuum source 228 of FIG. 2) in order to secure workpiece 200 in place with respect to fixture 100. During a repositioning process, fixture 100 may utilize variable pressure grippers 120 to apply a pressure to surface 216 of workpiece 200 (e.g., using pressure source 230 of FIG. 2) in order to "float" surface 216 of workpiece 200 on top surface 104 of base member 102. This allows linear actuators 108-109 to more easily reposition workpiece 200 with respect to base member 102 by reducing the sliding friction between top surface 104 of base member 102 and surface 216 of workpiece 200.

Although fixture 100 has been illustrated with a particular number of linear actuators 108-109, variable pressure grippers 120, and sensors 118-119, fixture 100 may include any number of linear actuators 108-109, variable pressure grippers 120, and sensors 118-119 in other embodiments.

Referring to FIG. 2 in particular, base member 102 may be mounted to a stand 204 along bottom surface 105 of base member 102, which allows workpiece 200 to be elevated for access by a robotic end mill 210. In this embodiment, robotic end mill 210 includes one or more robotic arms 212 that include an end effector 214. Robotic end mill 210 utilizes end effector 214 to perform machining operations on workpiece 200, including any of the machining operations previously described. In the embodiment illustrated in FIG. 2, workpiece 200 includes a web 206 and flanges 208-209 that extend away from web 206. In this configuration, workpiece 200 may comprise a spar for a wing of an aircraft.

As discussed previously, it was typical in the prior art to manually shim spars prior to performing machining operations on the spars in order to ensure that the spars were positioned correctly on the work stands. Correctly positioning the spars on the work stands is important in order to ensure that any machining operations performed on the spars are performed accurately, as the accuracy of the machining operations depends on an accurate placement of the spars on the work stands.

In FIG. 2, fixture 100 is used to reposition workpiece 200 on base member 102 to ensure that an indexing position 218 of base member 102 is aligned with a centerline 220 of workpiece 200. In some embodiments, indexing position 218 is a centerline of base member 102. Repositioning workpiece 200 may be performed in response to how workpiece 200 is loaded on fixture 100 and/or in response to fabrication variations in the dimensions of workpiece 200. In this embodiment, the operation of fixture 100 is automated by a controller 222, although in other embodiments, fixture 100 is controllable by other computing devices.

Controller 222 in this embodiment includes a processor 224 that is communicatively coupled to a memory 226. Processor 224 comprises any component, system, or device that performs the functions described herein for controller 222, including the activities described for operating fixture 100. Processor 224 includes any hardware device that is able to perform functions, and may include electronic circuits, optical circuits, or combinations of electronic and optical circuits. Processor 224 may include one or more Central Processing Units (CPU), microprocessors, Digital Signal Processors (DSPs), Application-specific Integrated Circuits (ASICs), etc. Some examples of processors include INTEL® CORE™ processors, Advanced Reduced Instruction Set Computing (RISC) Machines (ARM®) processors, etc.

Memory 226 includes any hardware device that is able to store data, including instructions for processor 224. Memory 226 may comprise electronic circuits, optical circuits, magnetic circuits, or combinations of electronic, optical, and magnetic circuits. Memory 226 may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

As discussed previously, vacuum grippers 116-117 may be supplied with vacuum by a vacuum source 228 when vacuum grippers 116-117 are in contact with surfaces 232-233 of workpiece 200. The vacuum applied by vacuum grippers 116-117 allow vacuum grippers 116-117 to grip workpiece 200. For example, vacuum gripper 116 may be supplied with vacuum by vacuum source 228, thereby gripping surface 232 of flange 208 when vacuum gripper 116 is in contact with surface 232. In like manner, vacuum gripper 117 may be supplied with vacuum by vacuum source 228, thereby gripping surface 233 of flange 209 when vacuum gripper 117 is in contact with surface 233. With workpiece 200 gripped in this manner, linear actuators 108-109 translate their outboard ends 114-115 along their axis 110-111 either towards or away from their sides 106-107 of base member 102 in order to reposition workpiece 200 on fixture 100.

In some embodiments, multiple fixtures 100 may be used to support workpiece 200, depending on the dimensions of workpiece 200, as illustrated in FIG. 3. In FIG. 3, stands 204 are omitted for clarity and the spar-like structure of workpiece 200 is more clearly identifiable.

Figure 4:
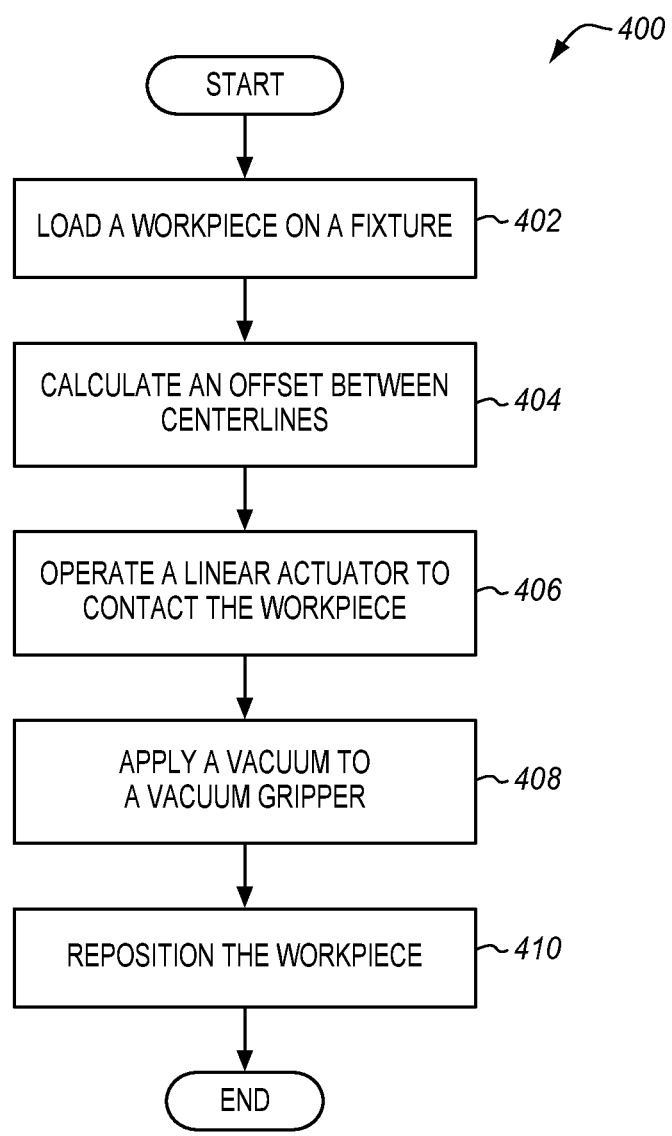
FIG. 4 is a flow chart of a method of operating a fixture to support, reposition, and secure a workpiece in place in an illustrative embodiment.
Figure 5:
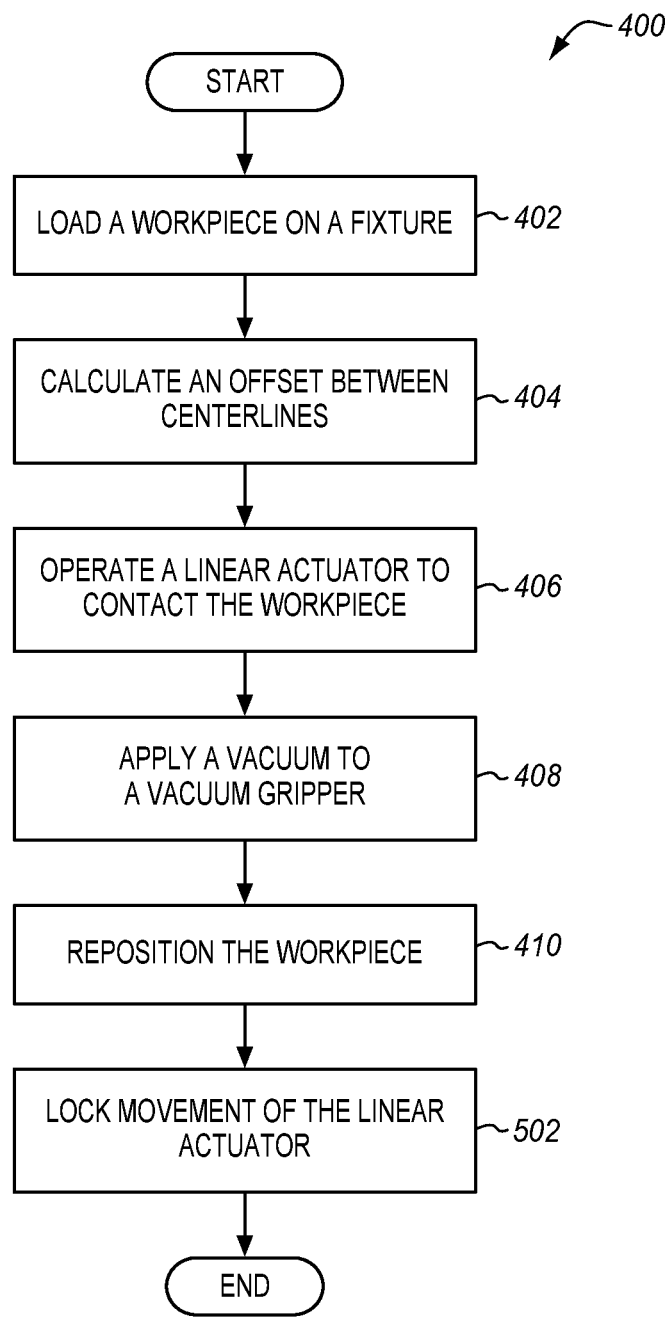
FIGS. 5-7 depict additional details of the method of FIG. 4 in illustrative embodiments.
Figure 6:
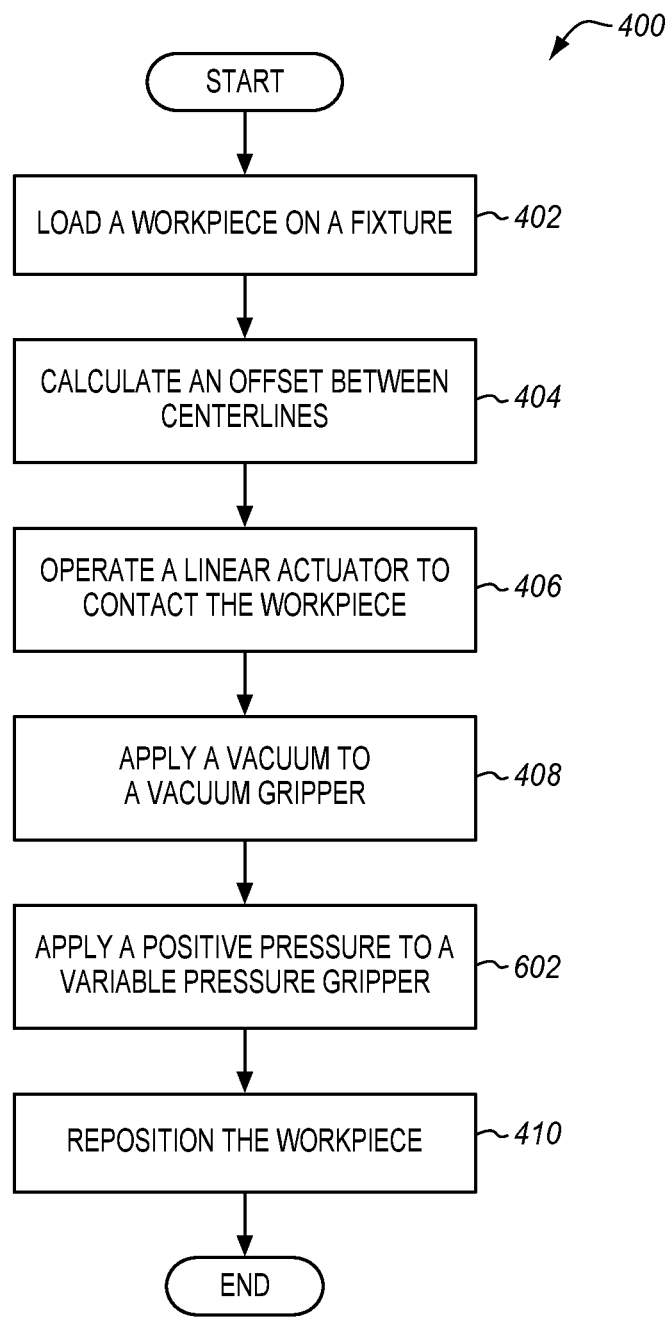
Figure 7:
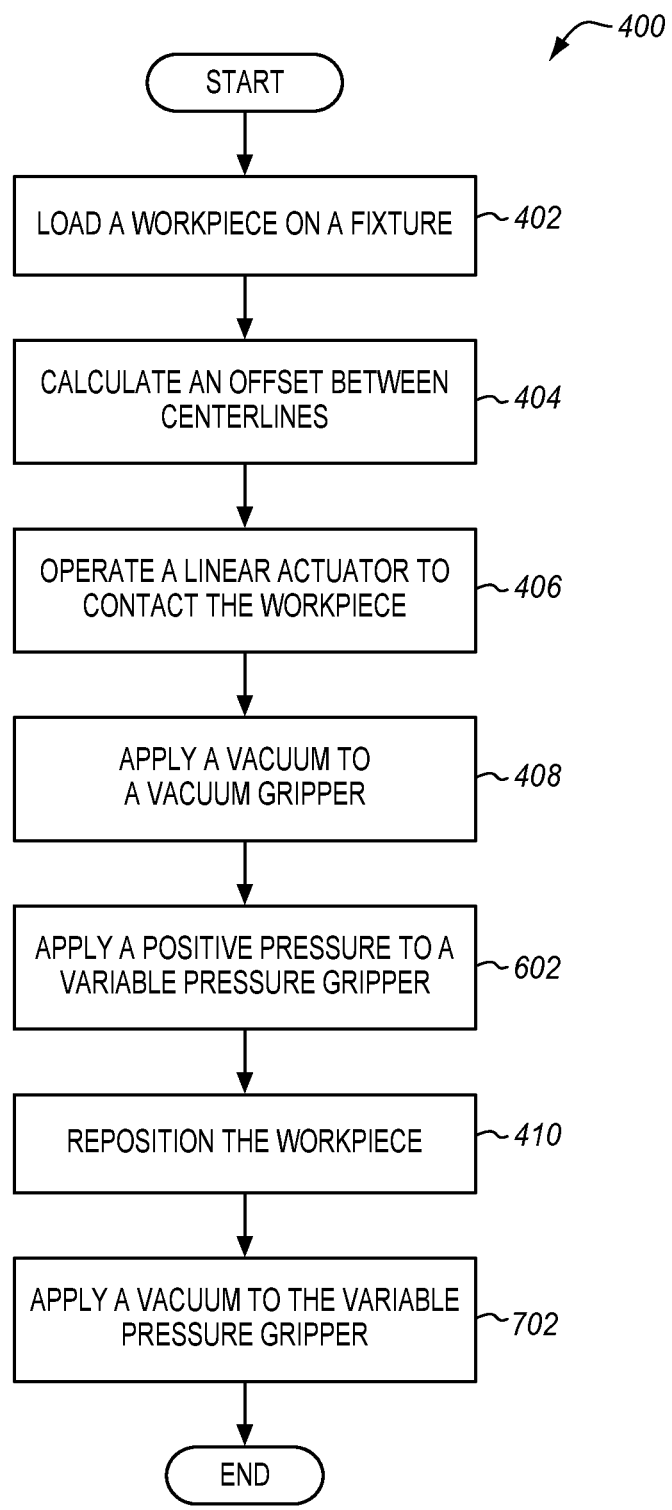

FIG. 4 is a flow chart of a method 400 of operating a fixture to support, reposition, and secure a workpiece in place in an illustrative embodiment, and FIGS. 5-7 depict optional steps for method 400. Further, FIGS. 8-15 are views of fixture 100 along view arrows 2-2 during different transitional states.

Method 400 will be described with respect to fixture 100, although method 400 may be implemented by other fixtures, not shown. The steps of method 400 are not all inclusive, and method 400 may include other steps, not shown. Further, the steps of method 400 may be performed in an alternate order.

Figure 8:
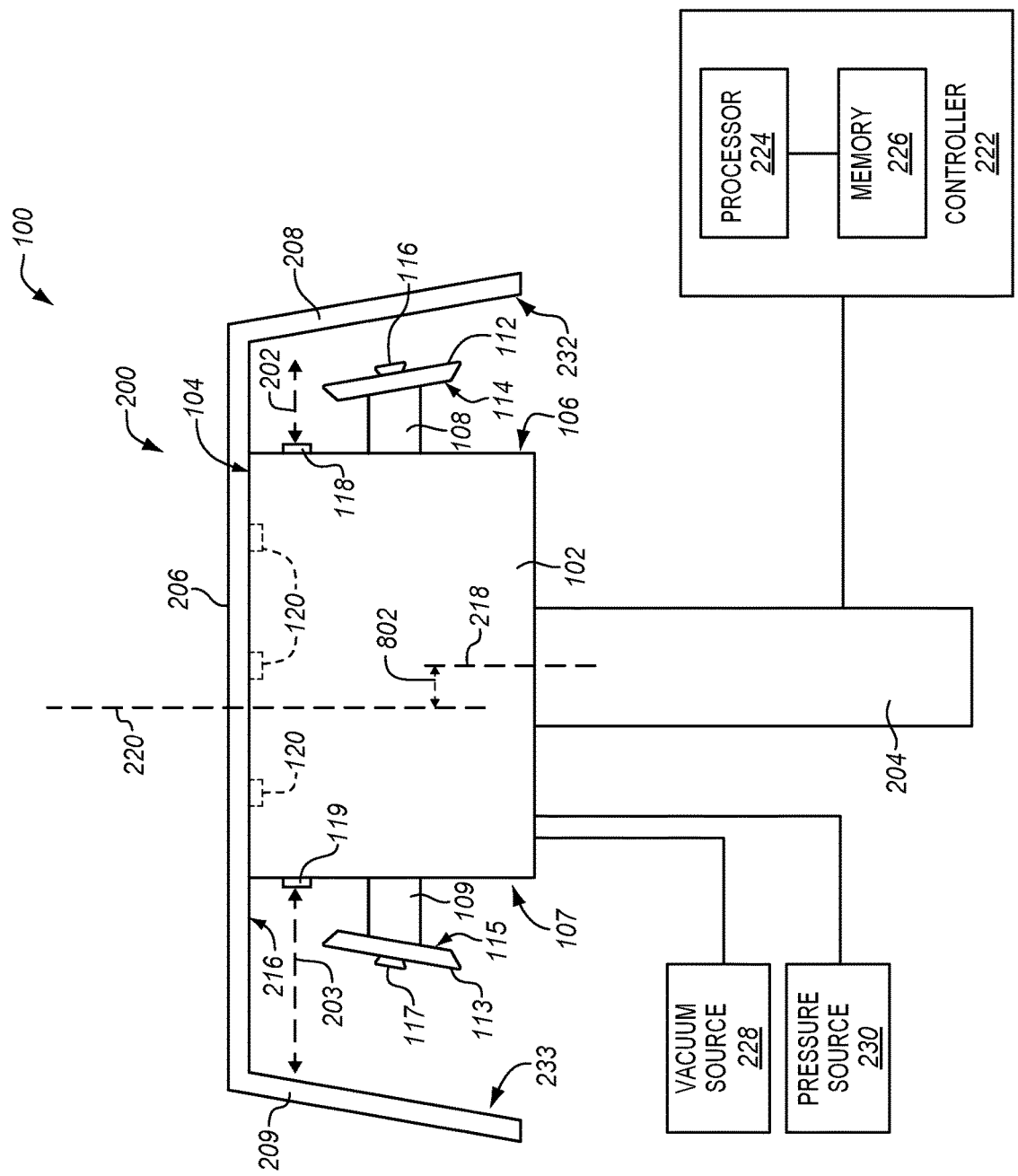
FIGS. 8-15 depict the fixture of FIGS. 1-3 at different operational states in illustrative embodiments.

Prior to loading workpiece 200 onto fixture 100, outboard ends 114-115 of linear actuators 108-109 are retracted towards their respective sides 106-107 in order to ensure that contact members 112-113 and/or vacuum grippers 116-117 are not damaged as workpiece 200 is loaded onto fixture 100 (see FIG. 8). In FIG. 8, workpiece 200 is loaded onto fixtured 100 such that centerline 220 of workpiece 200 and indexing position 218 of base member 102 are not coincident (see step 402). Rather, centerline 220 of workpiece 200 and indexing position 218 of base member 102 have offset 802 that is non-zero and in particular, is larger than a threshold value. Such a non-zero offset 802 is due to the imprecise loading process of workpiece 200 on fixture 100 and/or due to dimensional variations in workpiece 200 from one part to another part.

Processor 224 utilizes sensor 118 in order to measure distance 202 to surface 232 of workpiece 200. Using distance 202, processor 224 calculates offset 802 between centerline 220 of workpiece 200 and indexing position 218 of base member 102 (see step 404). For instance, memory 226 of controller 222 may store pre-defined dimensional data for workpiece 200, which may be used by processor 224 to calculate offset 802 based on the relationship between distance 202 and the pre-defined dimensional data for workpiece 200.

Offset 802 includes both a displacement value and a direction of displacement that depends on the frame of reference. In the following discussion, the frame of reference is fixture 100, and in particular, indexing position 218 of fixture 100. In FIG. 8, the direction of offset 802 of centerline 220 is to the left of indexing position 218, although the direction of offset 802 of centerline 220 may be to the right of indexing position 218 in other embodiments.

In response to calculating offset 802, processor 224 operates one or more of linear actuators 108-109 to extend their vacuum grippers 116-117 towards surfaces 232-233 of workpiece 200 (see step 406). Processor 224 may selectively operate one or more linear actuators 108-109 in order to reposition workpiece 200 on fixture 100 based on the direction of offset 802. For example, processor 224 may selectively operate linear actuators 108-109 on a common side depending on the direction of offset 802 of workpiece 200 on fixture 100. With offset 802 of centerline 220 being left of indexing position 218 as illustrated in FIG. 8, processor 224 may elect to operate linear actuator 108 alone in order to reposition workpiece 200 on fixture 100 and/or may elect to operate both linear actuators 108-109 in combination (e.g., by operating them in different combinations of extension and retraction after their vacuum grippers 116-117 have gripped workpiece 200).

Figure 9:
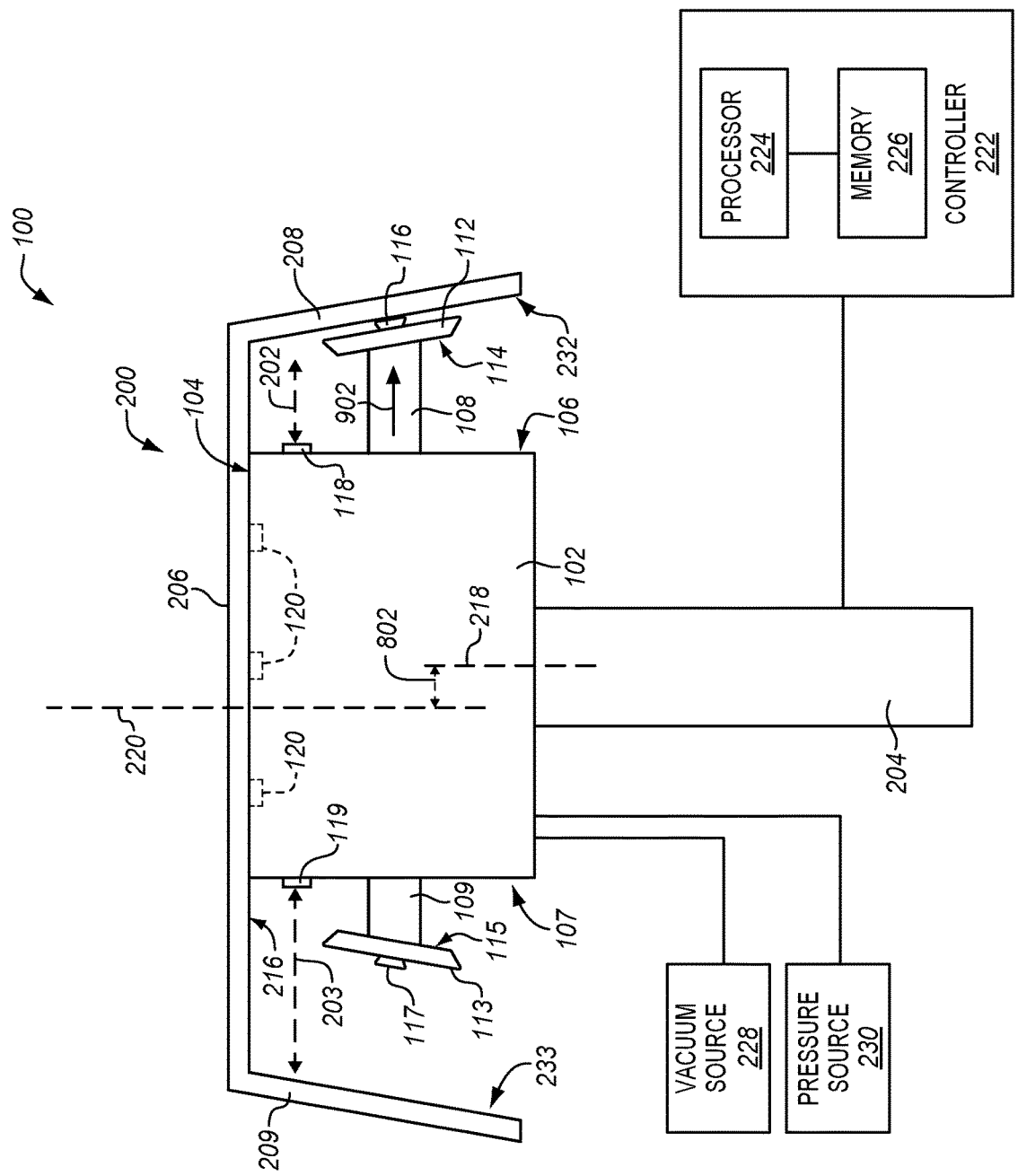
Figure 10:
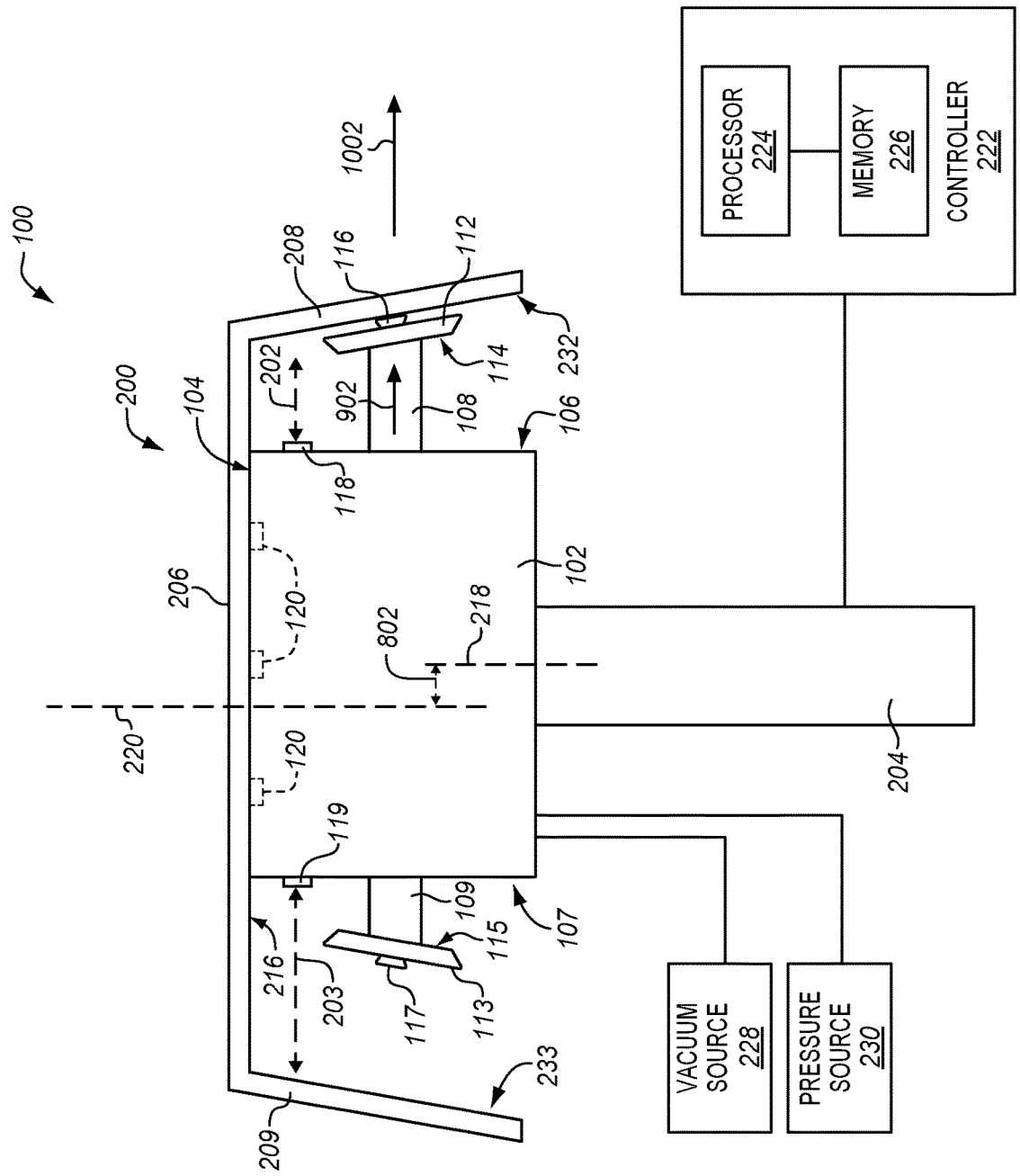

For the following discussion, FIGS. 9-10 will illustrate the use of linear actuator 108 by itself for repositioning workpiece 200 on fixture 100, while FIGS. 11-15 will illustrate the use of linear actuators 108-109 in combination for repositioning workpiece 200 on fixture 100.

In response to calculating offset 802 and selecting linear actuator 108, processor 224 extends outboard end 114 of linear actuator 108 as illustrated in FIG. 9 in the direction of arrow 902, thereby moving vacuum gripper 116 into contact with surface 232 of workpiece 200. With vacuum gripper 116 in contact with surface 232, processor 224 directs vacuum source 228 to apply a vacuum to vacuum gripper 116 (see step 408). For example, processor 224 may operate one or more valves (not shown) to apply vacuum source 228 to vacuum gripper 116. With vacuum applied to vacuum gripper 116, vacuum gripper 116 grips surface 232 of workpiece 200, although step 408 may be optional when a grip of workpiece 200 is not necessary (e.g., when linear actuator 108 can reposition workpiece 200 on fixture 100 without a grip on workpiece 200).

Figure 11:
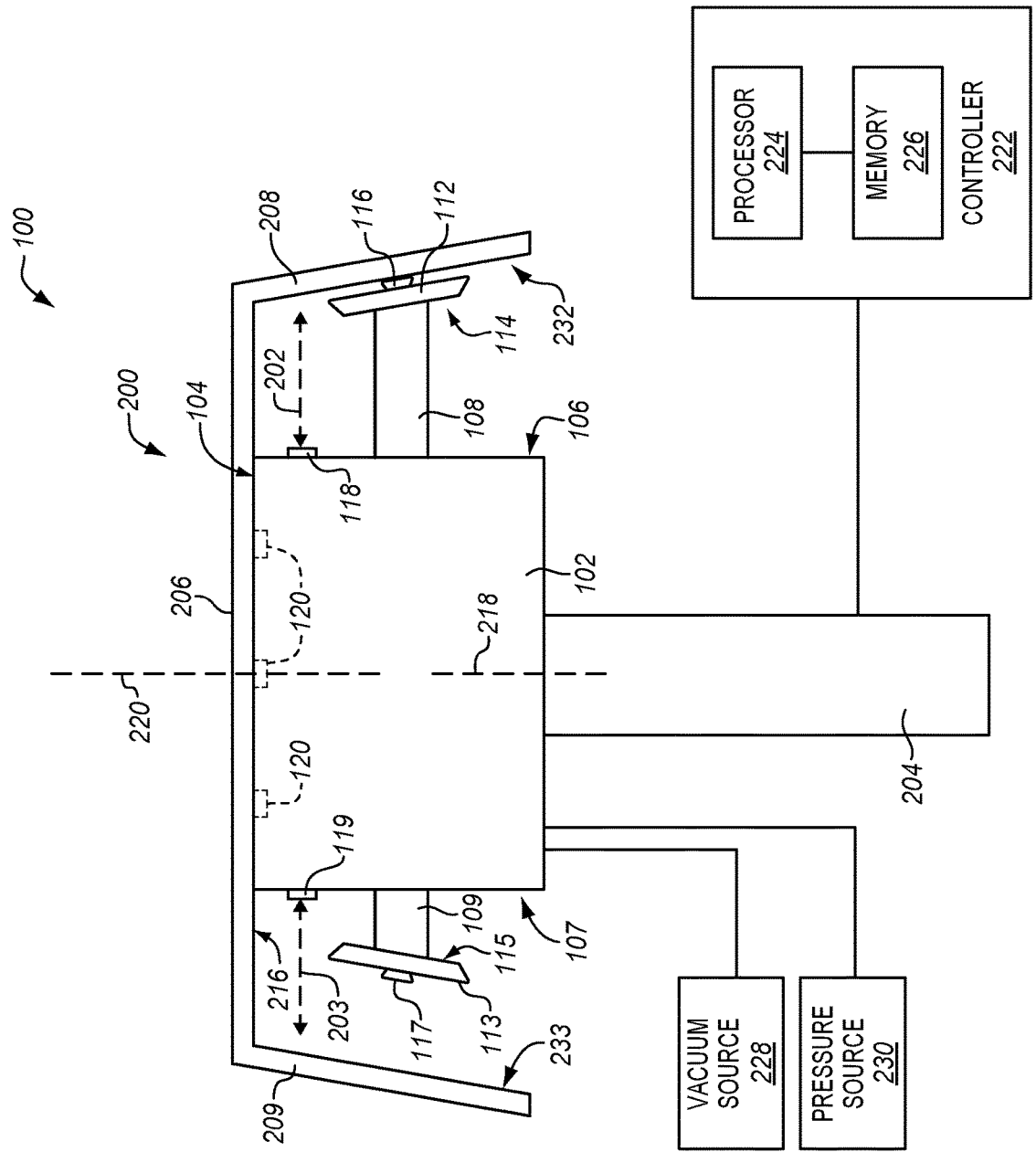
Figure 12:
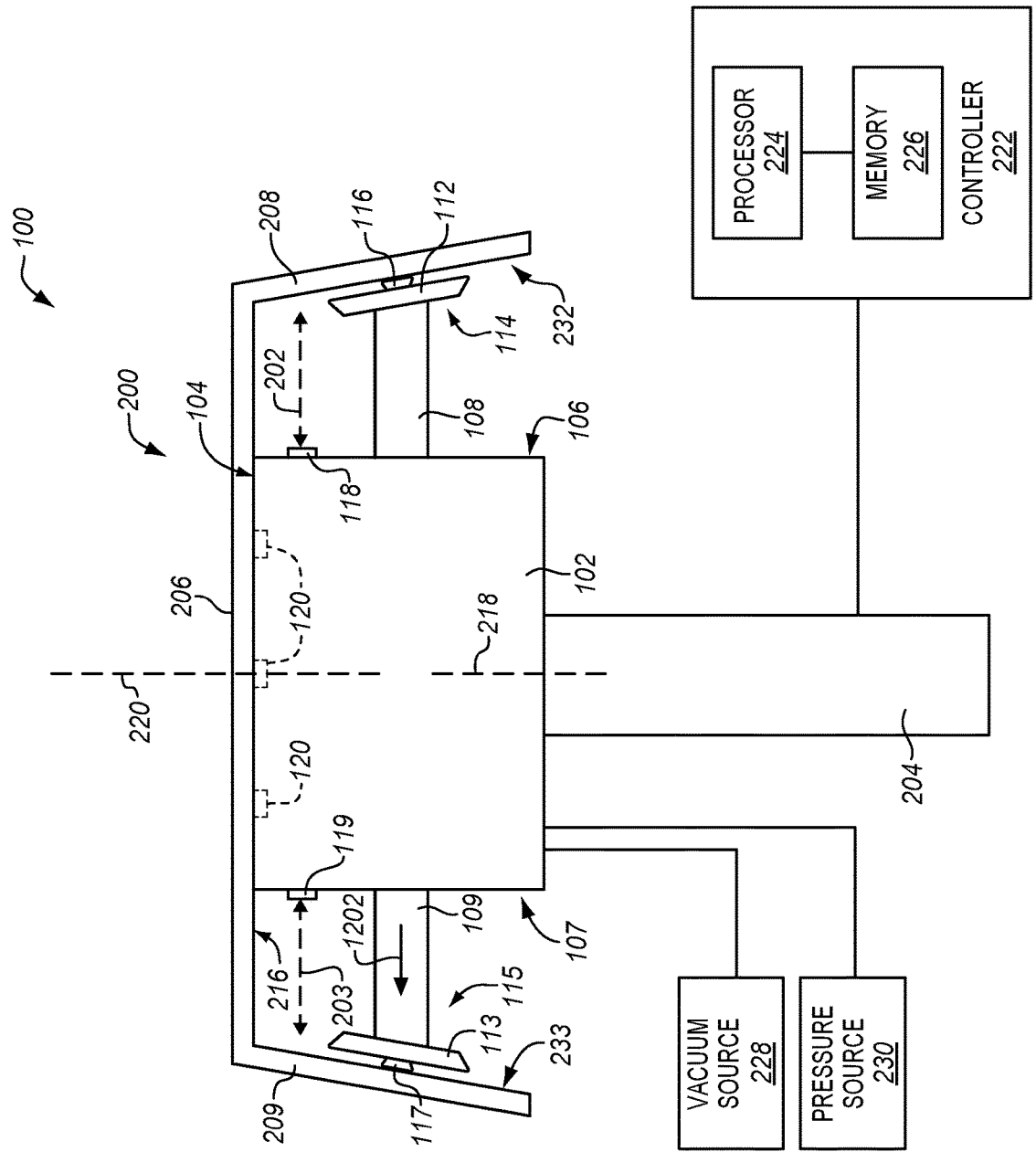

Processor 224 continues to extend outboard end 114 of linear actuator 108 in the direction of arrow 902 to move workpiece 200 in the direction of arrow 1002, as illustrated in FIG. 10. As processor 224 continues to extend outboard end 114 of linear actuator 108 in the direction of arrow 902, workpiece 200 continues to move in the direction of arrow 1002 until offset 802 is less than a threshold value, thereby effectively repositioning workpiece 200 on fixture 100 as illustrated in FIG. 11 (see step 410). With workpiece 200 repositioned on fixture 100, processor 224 may then extend outboard end 115 of linear actuator 109 in the direction of arrow 1202 as illustrated in FIG. 12 to extend vacuum gripper 117 until vacuum gripper 117 contacts surface 233 of workpiece 200, and apply a vacuum to vacuum gripper 117 to secure workpiece 200 to fixture 100. With workpiece 200 secured to fixture 100, robotic end mill 210 (see FIG. 2) may utilize end effector 214 to perform one or more machining operations on workpiece 200.

In an optional embodiment, processor 224 may lock one or more linear actuators 108-109 in place in response to repositioning workpiece 200 on fixture 100 (see step 502 of FIG. 5). The process to lock one or more linear actuators 108-109 in place may depend upon the type and construction of linear actuators 108-109. For example, if linear actuators 108-109 operate using mechanical screws to extend their outboard ends 114-115 either towards or away from their respective sides 106-107, then a locking mechanism may secure the screws from rotation in order to lock linear actuators 108-109 in place. In another example, if linear actuators 108-109 utilize hydraulics to extend their outboard ends 114-115 either towards or away from their respective sides 106-107, then one or more hydraulic valves (not shown) may be closed to maintain a hydraulic pressure on linear actuators 108-109 in order to lock linear actuators 108-109 in place.

In another optional embodiment, processor 224 may apply a positive pressure to variable pressure grippers 120 prior to repositioning workpiece 200 on fixture 100 (see step 602 of FIG. 6). For instance, processor 224 may operate one or more valves (not shown) to couple pressure source 230 to variable pressure grippers 120 in order to "float" surface 216 of workpiece 200 on top surface 104 of base member 102 using a film of air, thereby reducing the sliding friction between surface 216 of workpiece 200 and top surface 104 of base member 102.

In another optional embodiment, processor 224 may, in response to repositioning workpiece 200 on fixture 100, apply a vacuum to variable pressure grippers 120 (see step 702 of FIG. 7) in order to secure workpiece 200 in place on fixture 100. For instance, processor 224 may operate one or more valves (not shown) to couple vacuum source 228 to variable pressure grippers 120 in order to grip surface 216 of workpiece 200, thereby preventing workpiece 200 from moving relative to fixture 100. With workpiece 200 secured to fixture 100, robotic end mill 210 (see FIG. 2) may utilize end effector 214 to perform one or more machining operations on workpiece 200.

Figure 13:
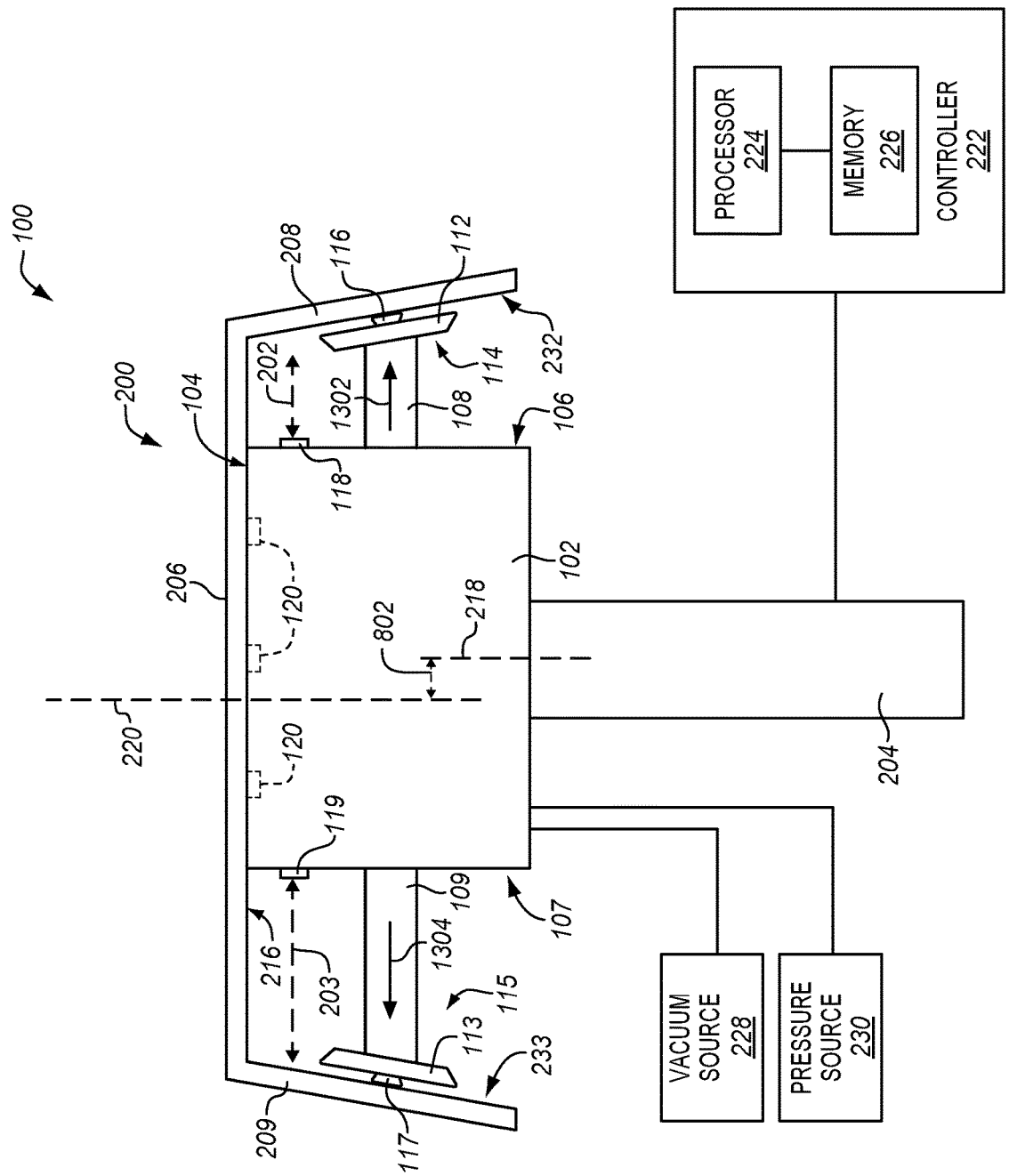
Figure 14:
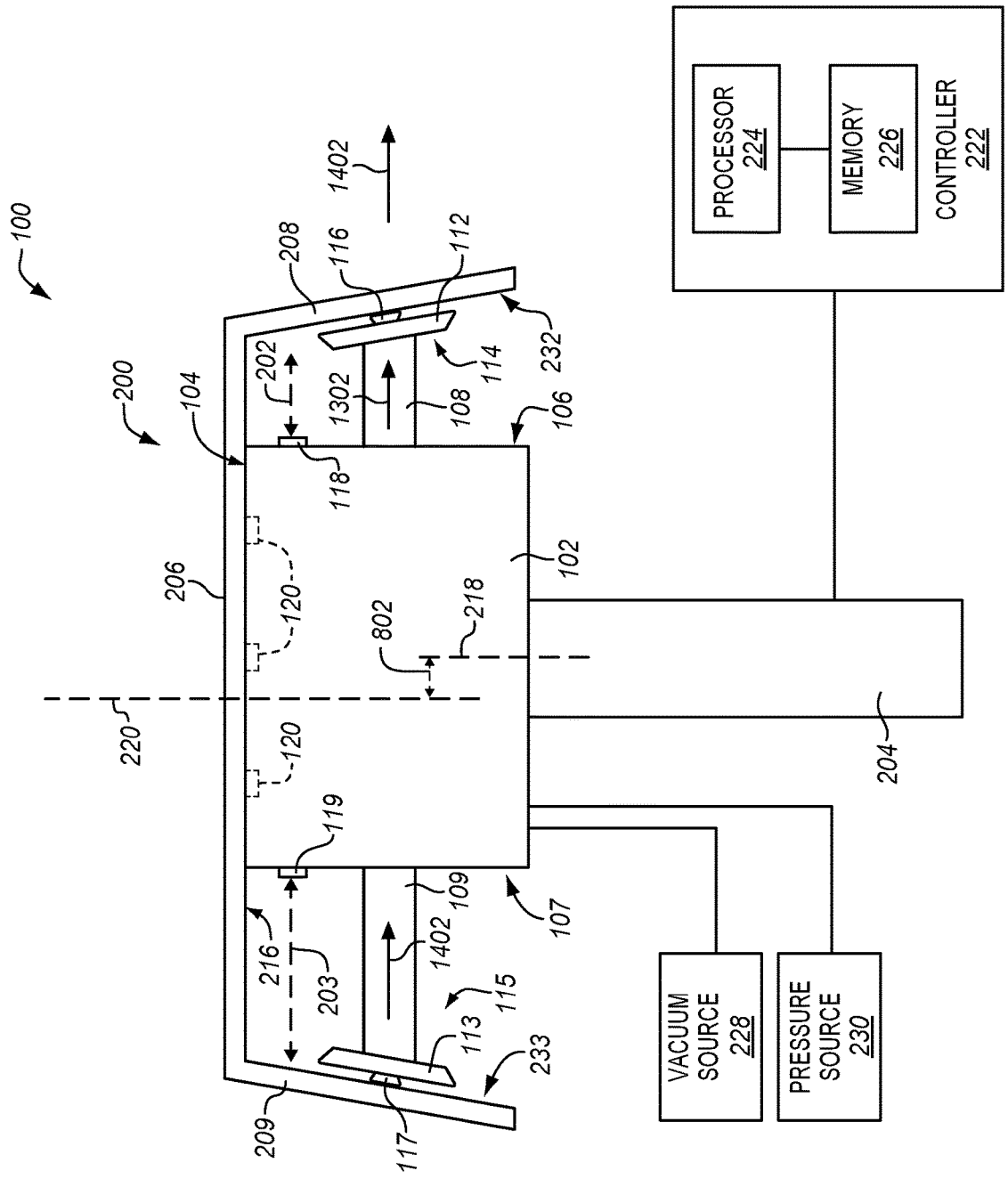
Figure 15:
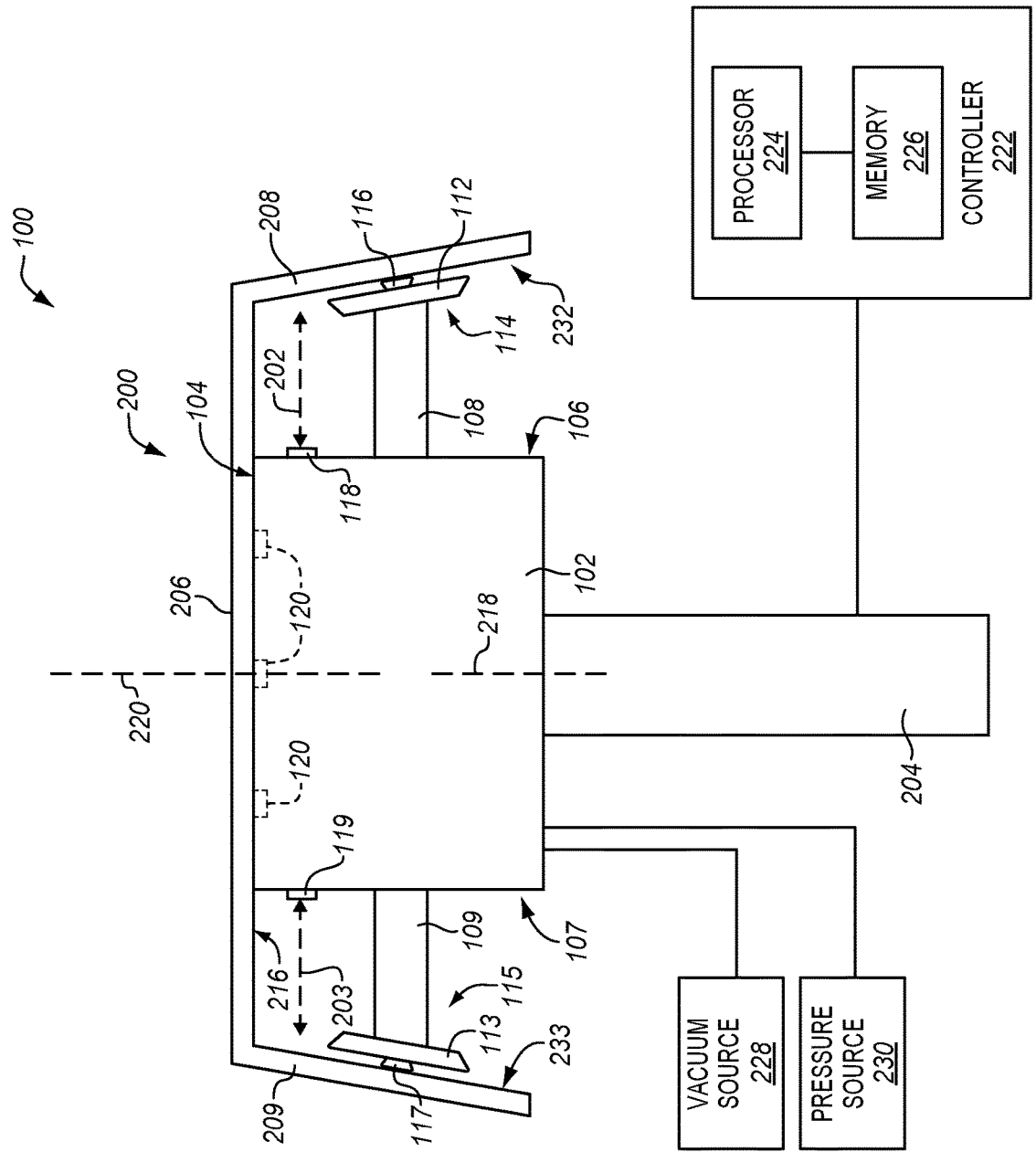

As discussed previously, processor 224 may operate linear actuators 108-109 in combination in order to reposition workpiece 200 on fixture 100, which is illustrated in FIG. 13. In FIG. 13, processor 224 extends outboard end 114 of linear actuator 108 in the direction of arrow 1302 and extends outboard end 115 of linear actuator 109 in the direction of arrow 1304 until their respective vacuum grippers 116-117 contact surfaces 232-233 of workpiece 200. With vacuum grippers 116-117 in contact with their respective surfaces 232-233, processor 224 applies vacuum source 228 to vacuum gripper 117 and optionally, vacuum gripper 116 to grip their respective surfaces 232-233. In order to reposition workpiece 200 using linear actuators 108-109 in combination, workpiece 200 is moved in the direction of arrow 1402 as illustrated in FIG. 14, with processor 224 extending outboard end 114 of linear actuator 108 in the direction of arrow 1302, and processor 224 retracting outboard end 115 of linear actuator 109 in the direction of arrow 1402. With vacuum applied to vacuum gripper 117, linear actuator 109 is able to grip surface 233 and pull workpiece 200 in the direction of arrow 1304, thereby operating in cooperation with linear actuator 108. Processor 224 continues to operate linear actuators 108-109 as illustrated in FIG. 14 until offset 802 is reduced below a threshold value, as depicted in FIG. 15. Any of the previously described optional steps of method 400 may also apply to the embodiments that utilize linear actuators 108-109 in combination.

Although fixture 100 has generally been described in isolation, a typical embodiment utilizes multiple fixtures 100 that operate cooperatively to support, reposition, and secure workpiece 200 in place as illustrated in FIG. 3. For example, fixtures 100 as illustrated in FIG. 3 may be separated into different zones, and operated independently in order to reposition workpiece 200 on fixtures 100.

Figure 16:
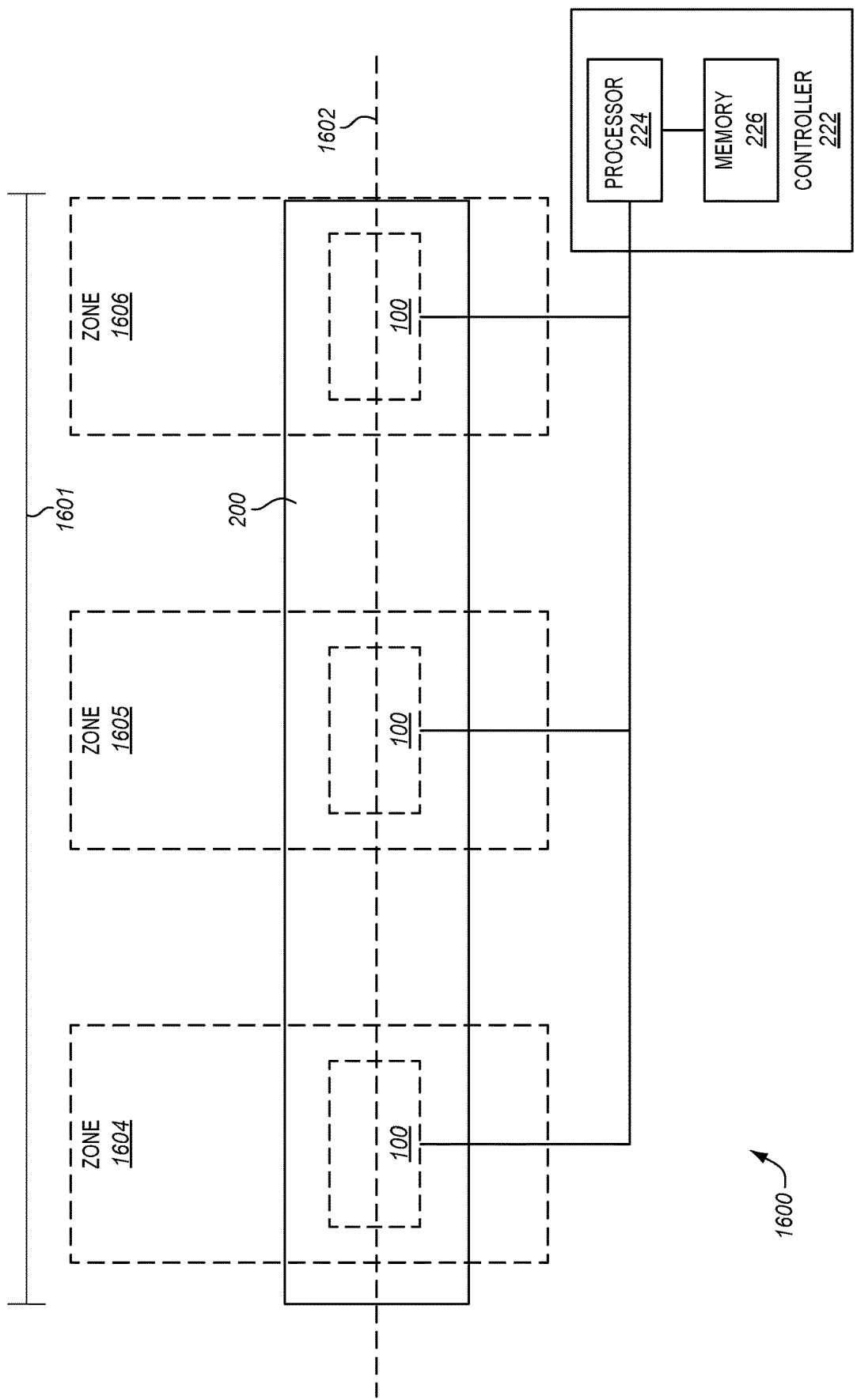
FIG. 16 depicts a tooling system in an illustrative embodiment.

FIG. 16 depicts a tooling system 1600 in an illustrative embodiment. FIG. 16 depicts a top view of workpiece 200 and fixtures 100 as illustrated in FIG. 3, with a plurality of fixtures 100 aligned with each other on a common indexing line 1602 along a length 1601 of workpiece 200. In some embodiments, indexing line 1602 is coincident with a centerline of base members 102 of fixtures 100. In this embodiment, fixtures 100 are organized into different zones 1604-1606, and are zone controllable by controller 222. Although only one fixture 100 is illustrated in each of zones 1604-1606, any number of fixtures 100 may be included in zones 1604-1606.

In this embodiment, processor 224 utilizes sensors 118-119 in fixtures 100 to measure a plurality of distances 202-203 to surfaces 232-233 of workpiece 200, and calculates a deflection of workpiece 200 with respect to common indexing line 1602 of fixtures 100.

Figure 17:
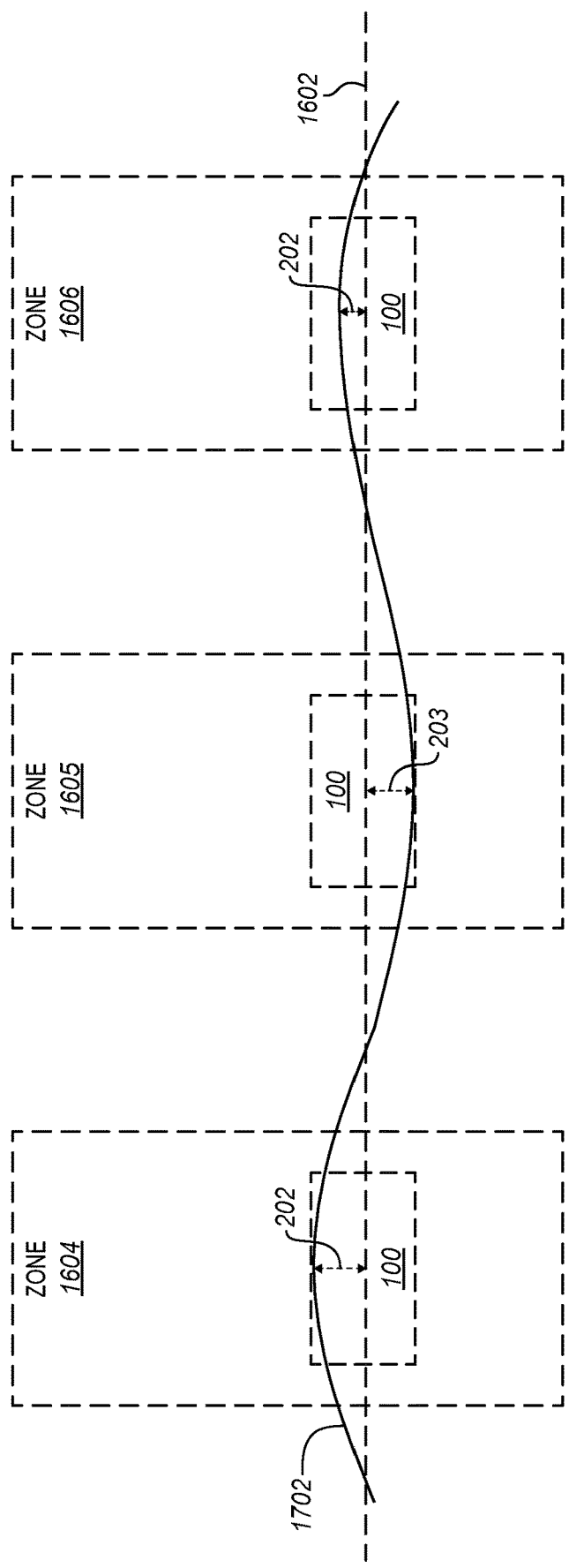
FIG. 17 depicts a deflected centerline of the workpiece of FIG. 16 in an illustrative embodiment.
Figure 18:
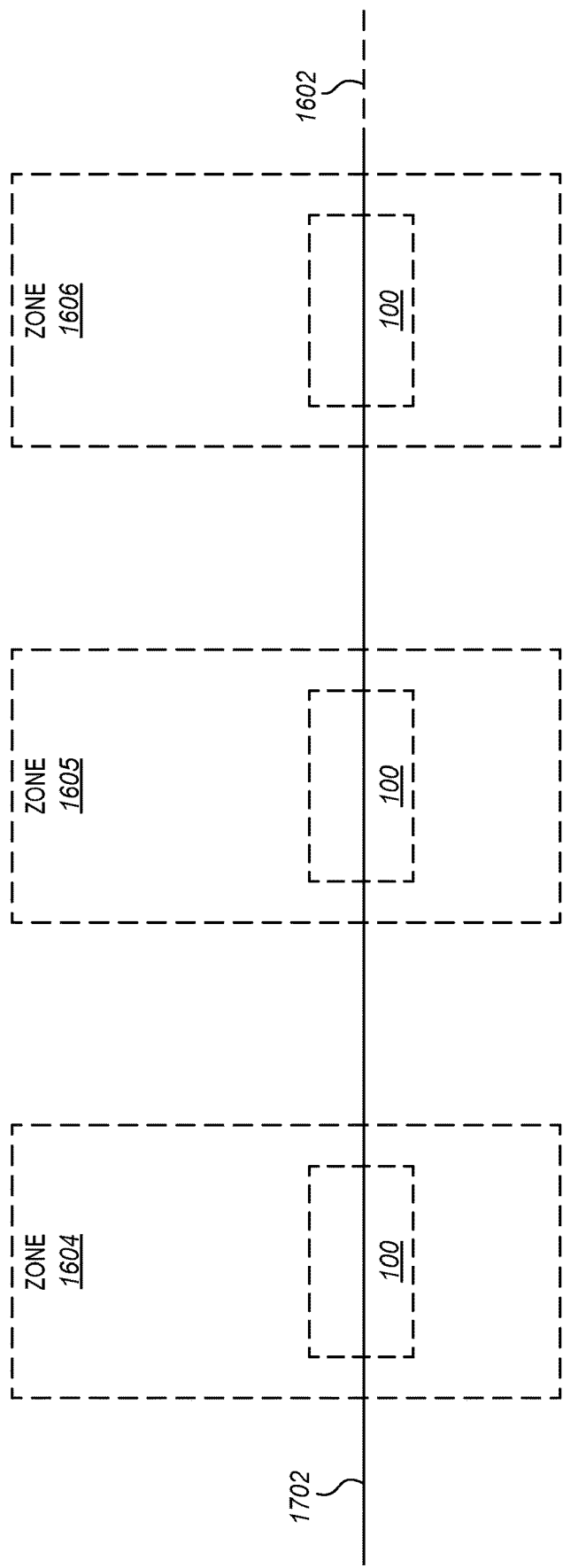
FIG. 18 depicts a corrected centerline for the workpiece of FIG. 16 in an illustrative embodiment.

FIG. 17 depicts (although exaggerated) a deflection of a centerline 1702 of workpiece 200 for purposes of discussion. Using the measurement information supplied by fixtures 100 in zones 1604-1606, processor 224 operates linear actuators 108-109 of fixtures 100 independently, for each of zones 1604-1606, to reduce the deflection of centerline 1702 of workpiece 200 below a threshold value. For instance, processor 224 may operate fixture 100 in zone 1604 to reduce distance 202 below a threshold value, in order to reduce the deflection of centerline 1702 in zone 1604 below a threshold value. In like manner, processor 224 may operate fixture 100 in zone 1605 to reduce distance 203 below a threshold value, in order to reduce the deflection of centerline 1702 in zone 1605 below a threshold value. Similarly, processor 224 may operate fixture 100 in zone 1606 to reduce distance 202 below a threshold value, in order to reduce the deflection of centerline 1702 in zone 1606 below a threshold value. The result of these individual actions for each of zones 1604-1606 is to reduce the deflection of centerline 1702 such that it more closely represents the view in FIG. 18.

Figure 19:
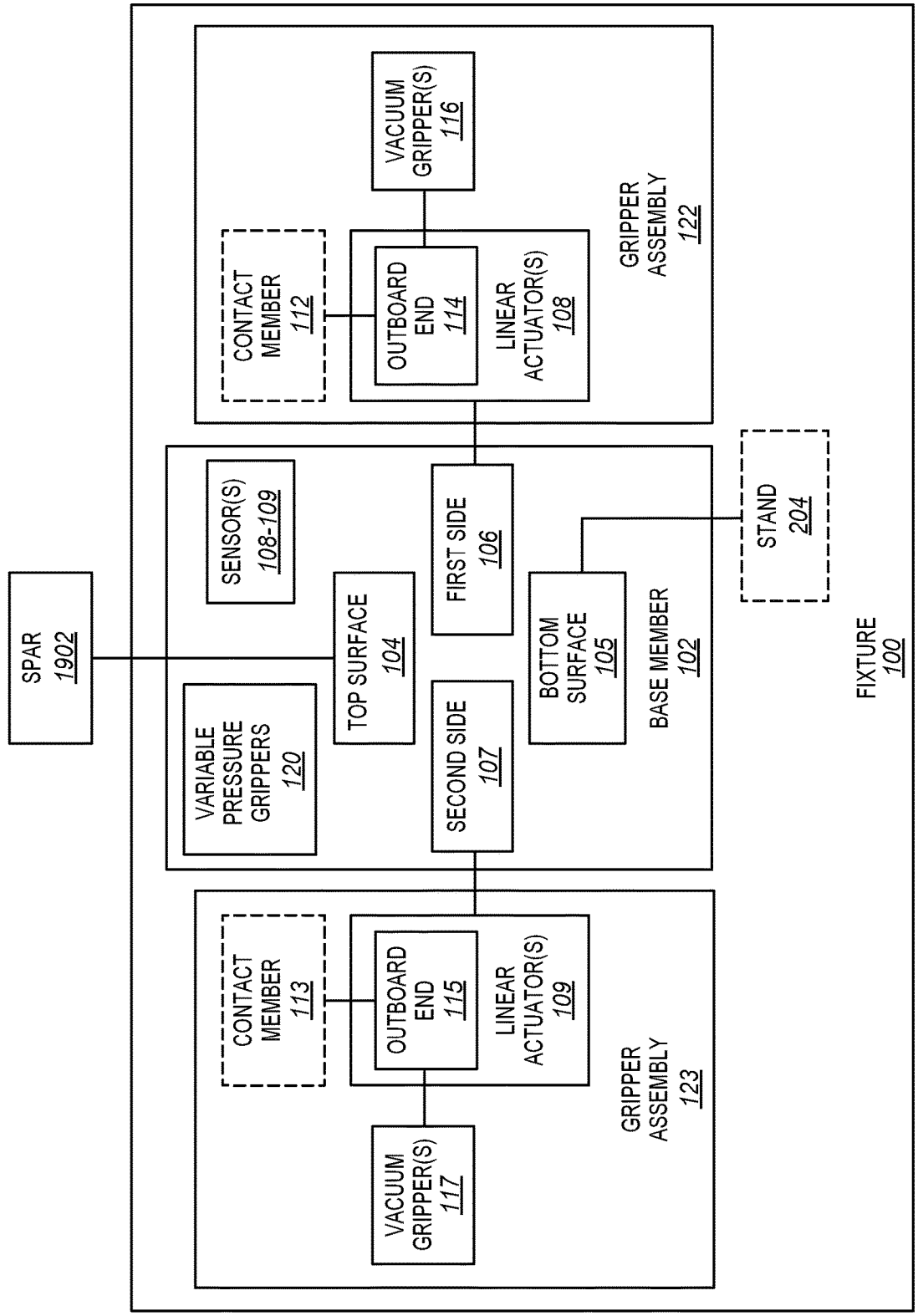
FIG. 19 is a block diagram of the fixture of FIGS. 1-2 in an illustrative embodiment.

FIG. 19 depicts a block diagram of fixture 100 in an illustrative embodiment. In this embodiment, fixture 100 includes base member 102, having top surface 104 that contacts and supports a spar 1902 for a wing of an aircraft, and a bottom surface 105 that may be coupled to stand 204. Base member 102 has a side 106 (e.g., a first side) and side 107 (e.g., a second side). Coupled to side 106 are one or more linear actuators 108, which have an outboard end 114 coupled to one or more vacuum grippers 116. A contact member 112 may also be coupled to outboard end 114. Vacuum grippers 116 and/or contact member 112 are configured to contact surfaces of spar 1902 in response to a linear movement of linear actuators 108. In like manner, coupled to side 107 are one or more linear actuators 109, which have an outboard end 115 coupled to one or more vacuum grippers 117. A contact member 113 may also be coupled to outboard end 115. Vacuum grippers 117 and/or contact member 113 are configured to contact surfaces of spar 1902 in response to a linear movement of linear actuators 109. In this embodiment, fixture 100 includes one or more sensor(s) 118-119, which are configured to measure distances to surfaces of spar 1902.

Generally, fixture 100 provides the ability to support, reposition, and secure workpiece 200 in place for machining operations, thereby providing a technical benefit over manually shimming parts, such as a spar for a wing of an aircraft. Fixture 100 therefore decreases the manual work and setup time that typically occurs during manually shimming parts prior to machining the parts, thereby improving the assembly process.

Figure 20:
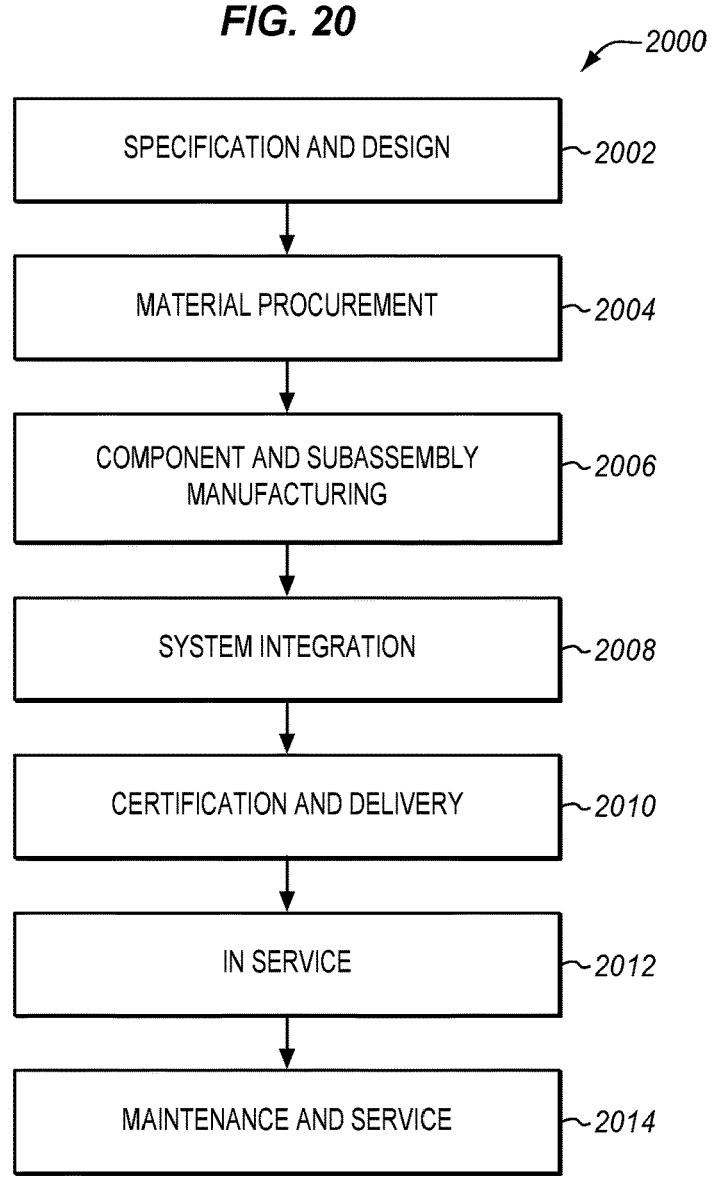
FIG. 20 is a flow chart illustrating an aircraft manufacturing and service method in an illustrative embodiment.
Figure 21:
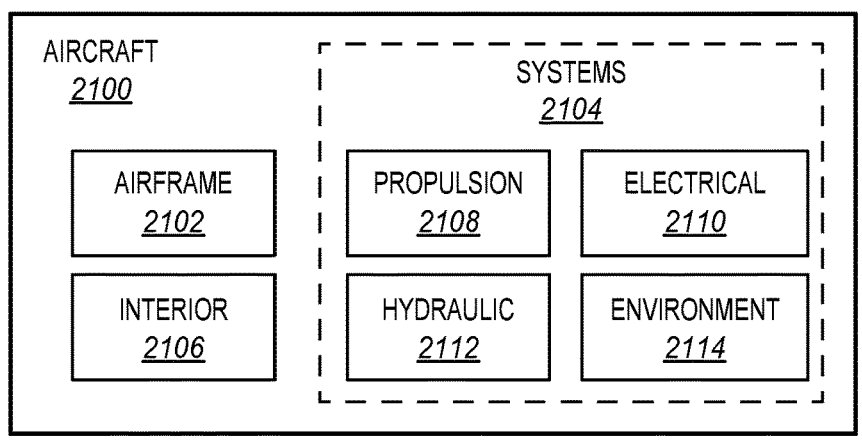
FIG. 21 is a schematic diagram of an aircraft in an illustrative embodiment.

The embodiments of the disclosure may be described in the context of an aircraft manufacturing and service method 2000 as shown in FIG. 20 and an aircraft 2100 as shown in FIG. 21. During pre-production, exemplary method 2000 may include specification and design 2002 of aircraft 2100, and material procurement 2004. During production, component and subassembly manufacturing 2006 and system integration 2008 of aircraft 2100 takes place. Thereafter, aircraft 2100 may go through certification and delivery 2010 in order to be placed in service 2012. While in service by a customer, aircraft 2100 is scheduled for routine maintenance and service 2014 (which may also include modification, reconfiguration, refurbishment, and so on).

Each of the processes of method 2000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 21, aircraft 2100 produced by exemplary method 2000 may include an airframe 2102 with a plurality of systems 2104 and an interior 2106. Examples of high-level systems 2104 include one or more of propulsion systems 2108, an electrical system 2110, a hydraulic system 2112, and an environmental system 2114. Any number of other systems may be included. Although an aerospace example is shown, the principles described in this specification may be applied to other industries, such as the automotive industry.

Apparatus and methods embodied herein may be employed during any one or more of the stages of the production and service method 2000. For example, components or subassemblies corresponding to component and subassembly manufacturing 2006 may be fabricated or manufactured in a manner similar to components or subassemblies produced while aircraft 2100 is in service. Also, one or more apparatus embodiments, method embodiments, or a combination thereof may be utilized during the component and subassembly manufacturing 2006 and system integration 2008, for example, by substantially expediting assembly of or reducing the cost of aircraft 2100. Similarly, one or more of apparatus embodiments, method embodiments, or a combination thereof may be utilized while aircraft 2100 is in service, for example and without limitation, to maintenance and service 2014.

Figure 22:
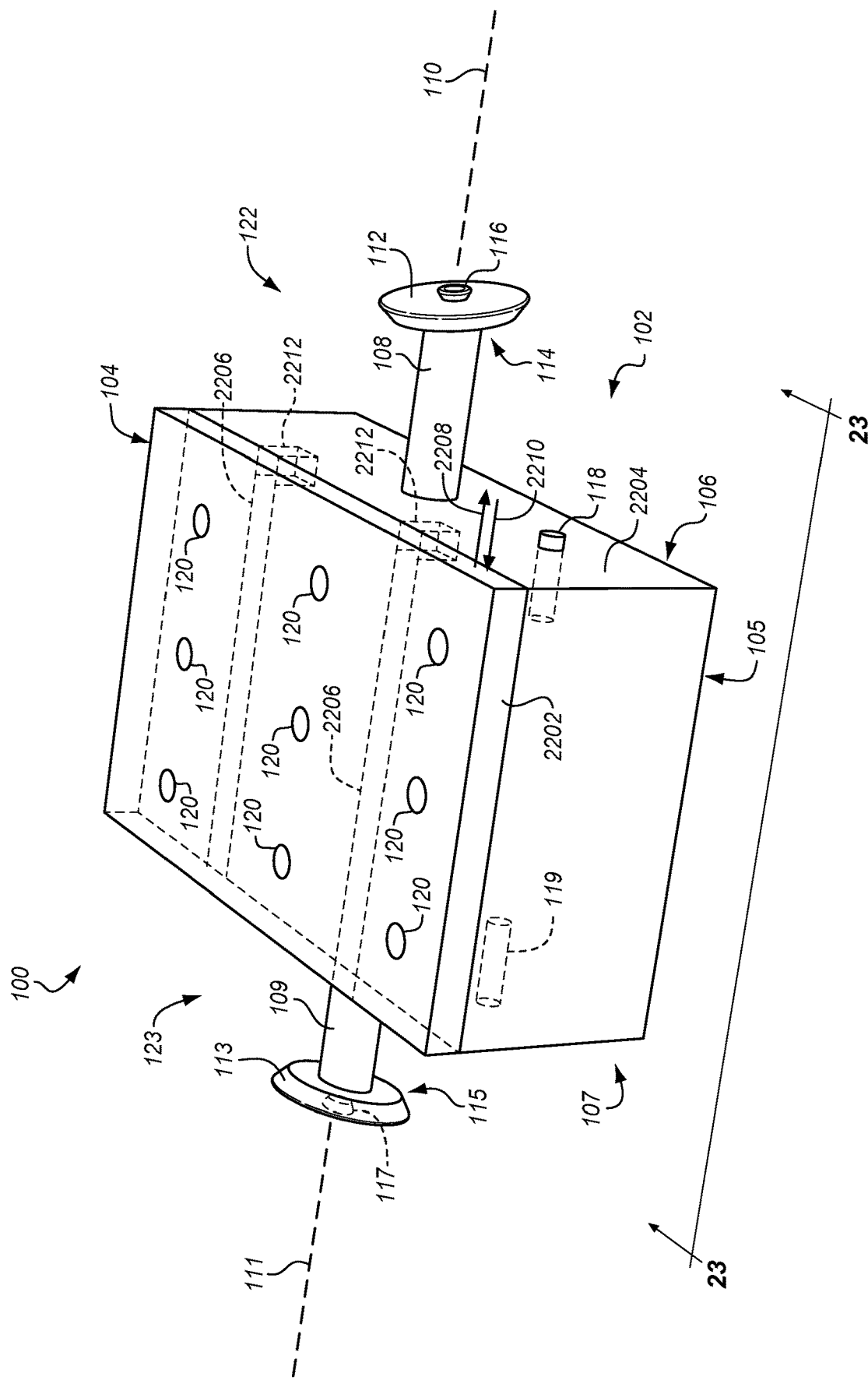
FIG. 22 depicts a fixture for supporting, repositioning, and securing a workpiece in place in another illustrative embodiment.

FIG. 22 is an isometric view of fixture 100 in another illustrative embodiment, and FIGS. 23-26 depict fixture 100 of FIG. 22 during various stages of operation. In this embodiment, base member 102 of fixture 100 includes an upper portion 2202 coupled to a lower portion 2204 by rails 2206. In this embodiment, rails 2206 allow upper portion 2202 of base member 102 to translate on rails 2206 with respect to lower portion 2204. For example, upper portion 2202 may translate to the right in FIG. 22 in the direction of arrow 2208 or may translate to the left in FIG. 22 in the direction of arrow 2210. In some embodiments, upper portion 2202 is free to slide back and forth in the directions of arrows 2208-2210 while repositioning workpiece 200, which will be discussed below. In other embodiments, upper portion 2202 is driven in translation in the directions of arrows 2208-2210 by a drive mechanism 2212. Drive mechanism 2212 may be used to augment the repositioning forces generated by linear actuators 108-109 in some embodiments.

Figure 23:
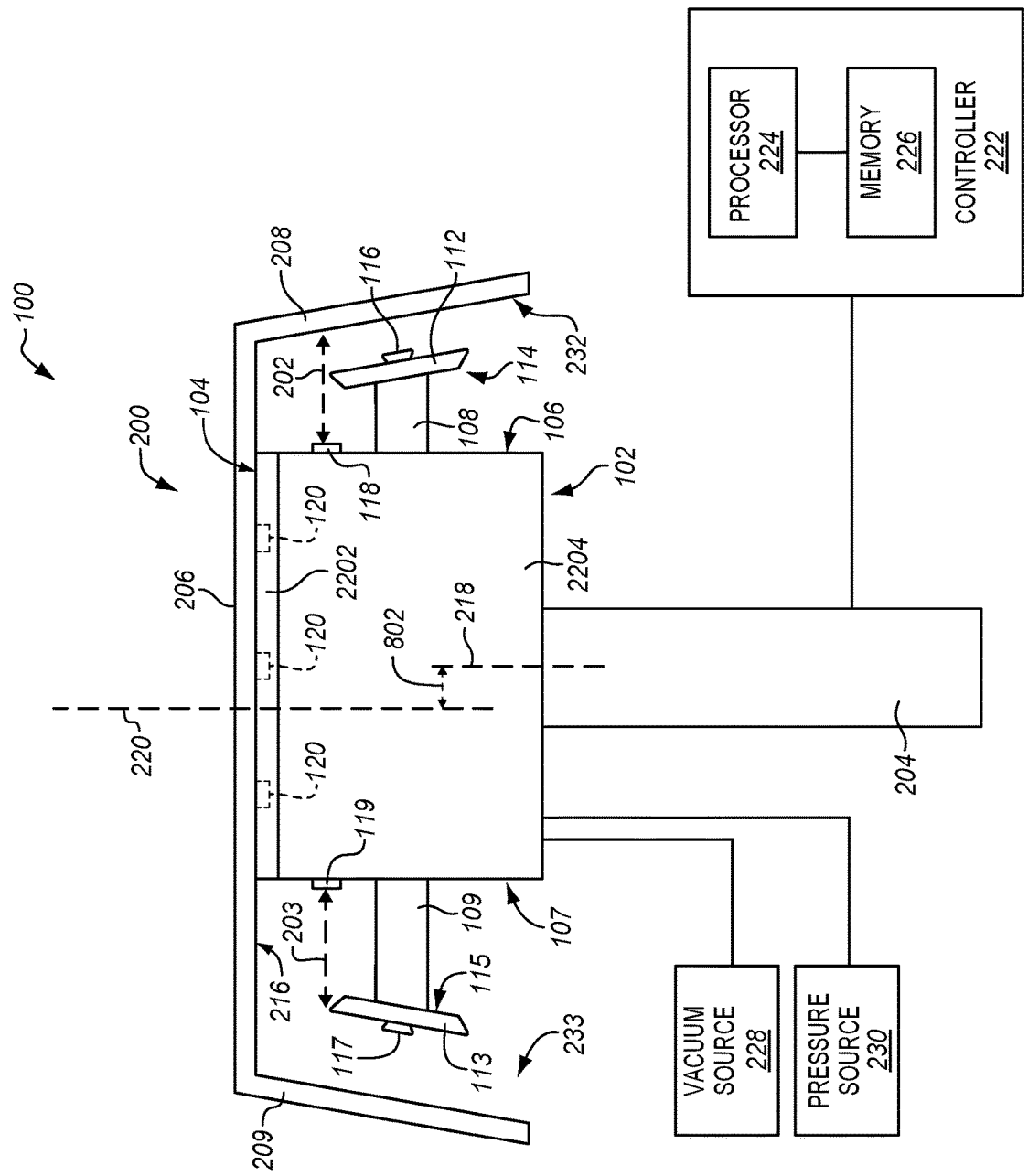
FIGS. 23-26 depict the fixture of FIG. 21 at different operational states in illustrative embodiments.

Prior to loading workpiece 200 onto fixture 100, outboard ends 114-115 of linear actuators 108-109 are retracted towards their respective sides 106-107 in order to ensure that contact members 112-113 and/or vacuum grippers 116-117 are not damaged as workpiece 200 is loaded onto fixture 100 (see FIG. 23). In FIG. 23, workpiece 200 is loaded onto fixtured 100 such that centerline 220 of workpiece 200 and indexing position 218 of base member 102 are not coincident. Rather, centerline 220 of workpiece 200 and indexing position 218 of base member 102 have offset 802 that is non-zero and in particular, is larger than a threshold value. Such a non-zero offset 802 is due to the imprecise loading process of workpiece 200 on fixture 100 and/or due to dimensional variations in workpiece 200 from one part to another part. Vacuum source 228 may then be applied to variable pressure grippers 120 to secure web 206 of workpiece 200 to upper portion 2202 of base member 102. As upper portion 2202 is free to translate on rails 2206, floating web 206 on top surface 104 of upper portion 2202 by applying pressure source 230 to variable pressure grippers 120 may be omitted. This is just one example in how fixture 100 of FIG. 22 operates differently than fixture 100 of FIG. 1.

Processor 224 utilizes sensor 118 in order to measure distance 202 to surface 232 of workpiece 200. Using distance 202, processor 224 calculates offset 802 between centerline 220 of workpiece 200 and indexing position 218 of base member 102. For instance, memory 226 of controller 222 may store pre-defined dimensional data for workpiece 200, which may be used by processor 224 to calculate offset 802 based on the relationship between distance 202 and the pre-defined dimensional data for workpiece 200.

Offset 802 includes both a displacement value and a direction of displacement that depends on the frame of reference. In the following discussion, the frame of reference is fixture 100, and in particular, indexing position 218 of fixture 100. In FIG. 23, the direction of offset 802 of centerline 220 is to the left of indexing position 218, although the direction of offset 802 of centerline 220 may be to the right of indexing position 218 in other embodiments.

In response to calculating offset 802, processor 224 operates one or more of linear actuators 108-109 to extend their vacuum grippers 116-117 towards surfaces 232-233 of workpiece 200. Processor 224 may selectively operate one or more linear actuators 108-109 in order to reposition workpiece 200 on fixture 100 based on the direction of offset 802. For example, processor 224 may selectively operate linear actuators 108-109 on a common side depending on the direction of offset 802 of workpiece 200 on fixture 100. With offset 802 of centerline 220 being left of indexing position 218 as illustrated in FIG. 23, processor 224 may elect to operate linear actuator 108 alone in order to reposition workpiece 200 on fixture 100 and/or may elect to operate both linear actuators 108-109 in combination (e.g., by operating them in different combinations of extension and retraction after their vacuum grippers 116-117 have gripped workpiece 200).

Figure 24:
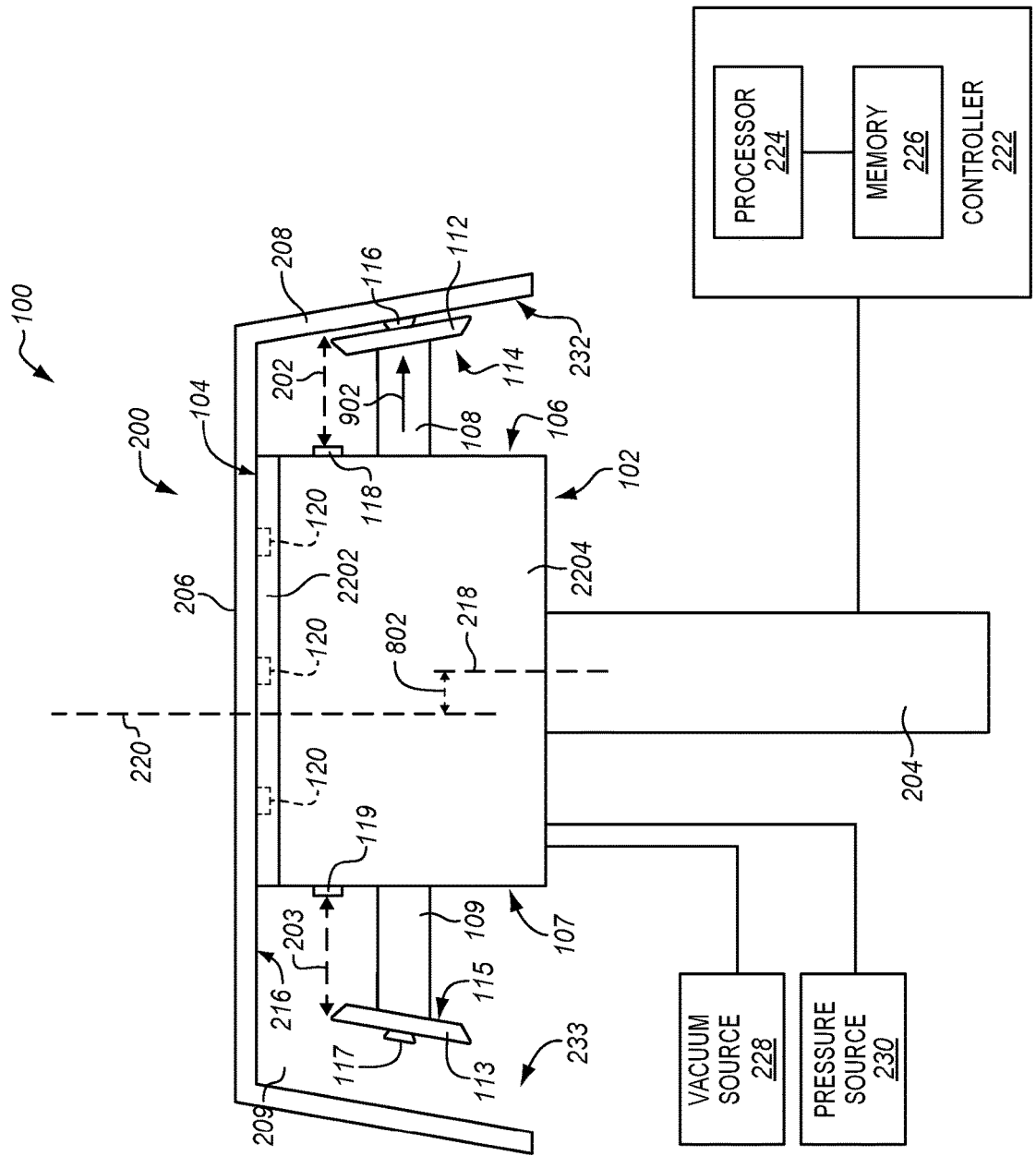
Figure 25:
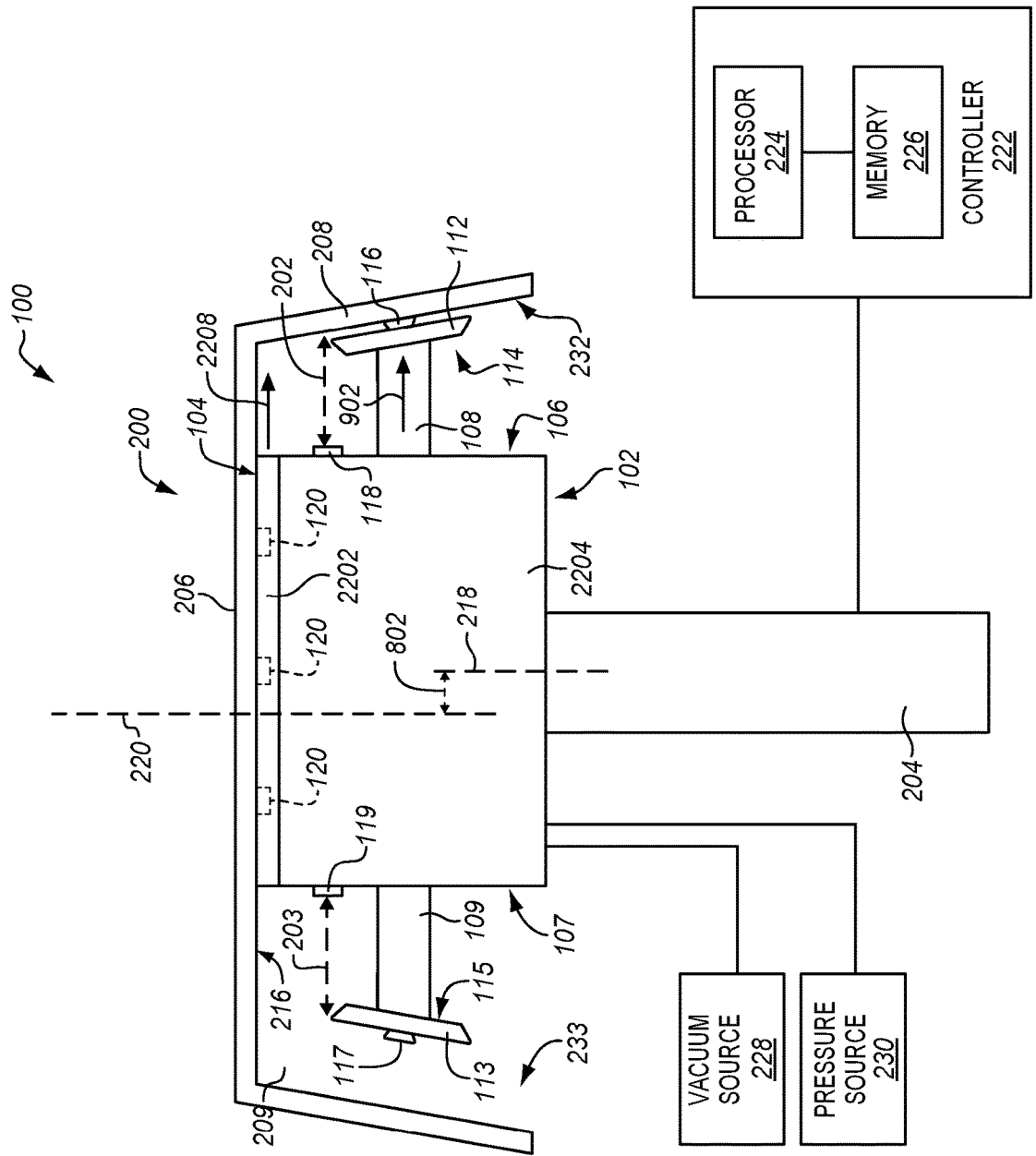
Figure 26:
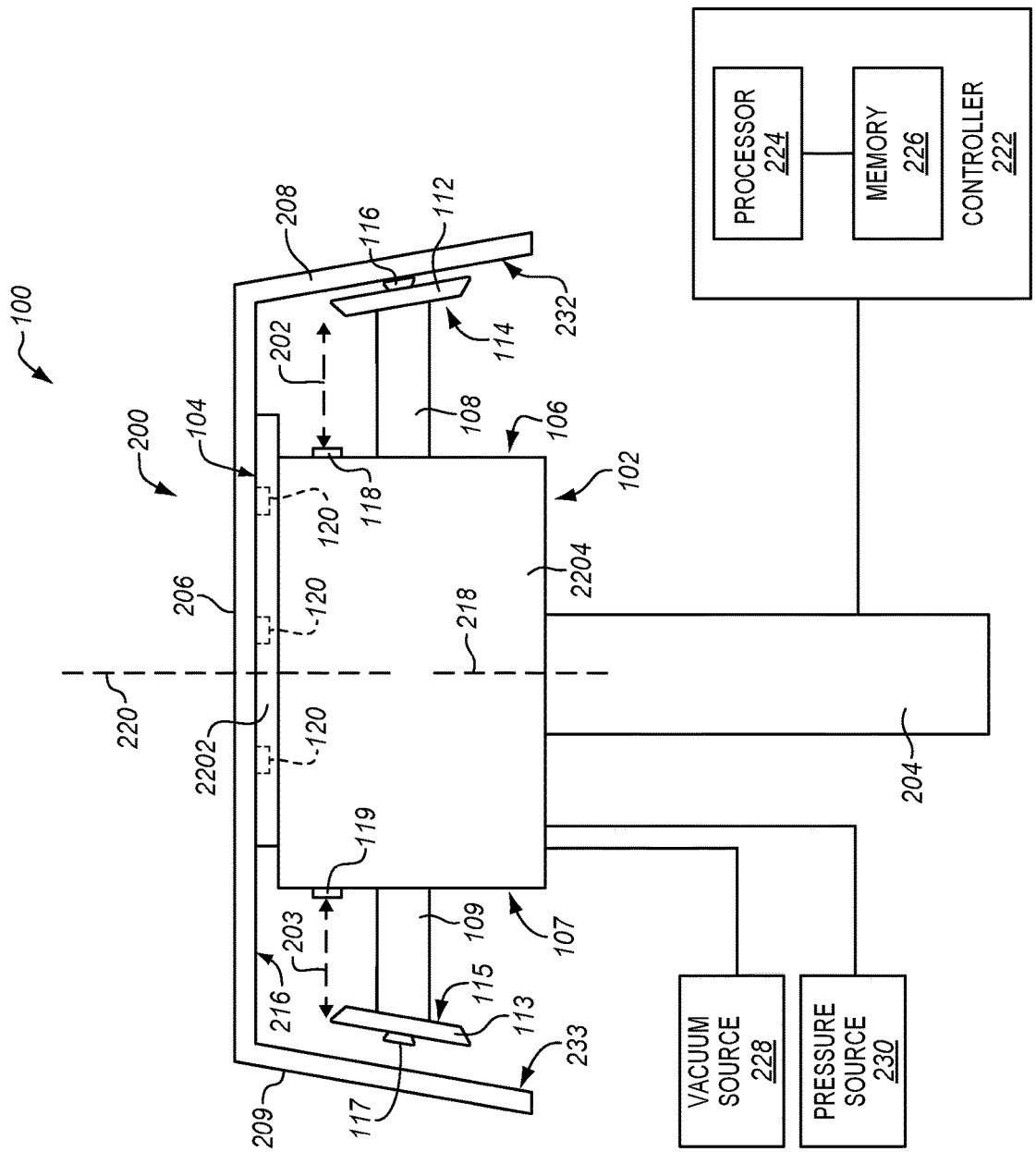

For the following discussion, FIGS. 24-26 will illustrate the use of linear actuator 108 by itself for repositioning workpiece 200 on fixture 100, although linear actuator 109 may also be used in a manner similar to those previously described for FIGS. 11-15.

In response to calculating offset 802 and selecting linear actuator 108, processor 224 extends outboard end 114 of linear actuator 108 as illustrated in FIG. 24 in the direction of arrow 902, thereby moving vacuum gripper 116 into contact with surface 232 of workpiece 200. With vacuum gripper 116 in contact with surface 232, processor 224 directs vacuum source 228 to apply a vacuum to vacuum gripper 116. For example, processor 224 may operate one or more valves to apply vacuum source 228 to vacuum gripper 116. With vacuum applied to vacuum gripper 116, vacuum gripper 116 grips surface 232 of workpiece 200, although this may be optional when a grip of workpiece 200 is not necessary (e.g., when linear actuator 108 can reposition workpiece 200 on fixture 100 without a grip on workpiece 200).

Processor 224 continues to extend outboard end 114 of linear actuator 108 in the direction of arrow 902 to move workpiece 200 in the direction of arrow 902, as illustrated in FIG. 25. In some embodiments, moving workpiece 200 may be augmented using drive system 2212 (see FIG. 22), which drives upper portion 2202 of base member 102 in the same direction as arrow 902. In other embodiments, upper portion 2202 is free to translate on rails 2206 (see FIG. 22) without the use of drive mechanism 2212.

As processor 224 continues to extend outboard end 114 of linear actuator 108 in the direction of arrow 902 (and/or drive mechanism 2212 drives upper portion 2202 in the direction of arrow 2208), workpiece 200 continues to move in the direction of arrow 902 until offset 802 is less than a threshold value, thereby effectively repositioning workpiece 200 on fixture 100 as illustrated in FIG. 26. With workpiece 200 repositioned on fixture 100, processor 224 may then extend outboard end 115 of linear actuator 109 until vacuum gripper 117 contacts surface 233 of workpiece 200, and apply a vacuum to vacuum gripper 117 to secure workpiece 200 to fixture 100. With workpiece 200 secured to fixture 100, robotic end mill 210 (see FIG. 2) may utilize end effector 214 to perform one or more machining operations on workpiece 200.

The use of upper portion 2202 in this embodiment that translates on rails 2206 reduces the preload applied to workpiece 200 when workpiece 200 is repositioned.

FIG. 27 is a block diagram of fixture 100 depicted in FIG. 22 in an illustrative embodiment. As FIG. 27 is similar to FIG. 19, only the differences between the two figures will be discussed. In FIG. 27, upper portion 2202 of base member 102 includes variable pressure grippers 120 proximate to top surface 104, which supports spar 1902. Rails 2206 couple upper portion 2202 with lower portion 2204 of base member 102, with optional drive mechanism 2212 used to augment the movement of upper portion 2202 in some embodiments.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof

What is claimed is:
1. A tooling fixture, comprising:
a base member having a top surface configured to support a workpiece when a first surface of the workpiece contacts the top surface;

a first gripper assembly and a second gripper assembly disposed on opposing sides of the base member, wherein the first gripper assembly comprises:
a first linear actuator coupled to a first side of the base member, and configured to extend a first outboard end linearly in a first direction away from the first side and the second gripper assembly; and
a first vacuum gripper located at the first outboard end;

wherein the second gripper assembly comprises:
a second linear actuator coupled to a second side of the base member, and configured to extend a second outboard end linearly in a second direction away from the second side and the first gripper assembly; and
a second vacuum gripper located at the second outboard end;

a sensor located on the first side of the base member, and configured to measure a distance to a second surface of the workpiece; and a controller configured to calculate an offset between an indexing position on the base member and a centerline of the workpiece based on the distance measured by the sensor, to operate the first linear actuator to extend the first outboard end in the first direction and bring the first vacuum gripper into contact with the second surface of the workpiece, to apply a vacuum to the first vacuum gripper to grip the second surface of the workpiece, and to reposition the workpiece on the base member utilizing the first linear actuator of the first gripper assembly until the offset is less than a threshold value.

2. The tooling fixture of claim 1, wherein:
the controller, in response to the offset being less than the threshold value, is configured to lock movement of the first linear actuator to secure the workpiece.

3. The tooling fixture of claim 1, wherein:
the workpiece comprises a spar of an aircraft wing having a web that contacts the top surface of the base member, and flanges that extend from the web.

4. The tooling fixture of claim 1, further comprising:
at least one variable pressure gripper along the top surface of the base member,
wherein, prior to repositioning the workpiece, the controller is configured to apply a positive pressure to the at least one variable pressure gripper to form a film of air between the top surface of the base member and the first surface of the workpiece.

5. The tooling fixture of claim 4, wherein:
the controller, in response to the offset being less than the threshold value, is configured to apply a vacuum to the at least one variable pressure gripper to grip the first surface of the workpiece.

6. The tooling fixture of claim 1, wherein:
the controller is configured to operate the second linear actuator to extend the second outboard end in the second direction and bring the second vacuum gripper into contact with a third surface of the workpiece, and to apply a vacuum to the second vacuum gripper to grip the third surface of the workpiece.

7. The tooling fixture of claim 6, wherein:
the controller is configured to reposition the workpiece on the base member utilizing the first linear actuator and the second linear actuator in combination until the offset is less than the threshold value.

8. The tooling fixture of claim 1, wherein the base member comprises:
an upper portion proximate to the workpiece;
a lower portion; and
at least one rail slidably coupling the upper portion to the lower portion so that the upper portion translates on the at least one rail with respect to the lower portion,
wherein the controller is configured to reposition the workpiece on the base member utilizing the first linear actuator to slide the upper portion on the at least one rail until the offset is less than the threshold value.

9. The tooling fixture of claim 8, wherein:
the upper portion is driven to translate on the at least one rail with respect to the lower portion when repositioning the workpiece.

10. A tooling system, comprising:
a plurality of tooling fixtures disposed in a common indexing line and configured to hold a workpiece along a length, each of the tooling fixtures comprising:
a base member having a top surface configured to support the workpiece when a first surface of the workpiece contacts the top surface;
a first gripper assembly and a second gripper assembly disposed on opposing sides of the base member,
wherein the first gripper assembly comprises:
a first linear actuator coupled to a first side of the base member, and configured to extend a first outboard end linearly in a first direction away from the first side and the second gripper assembly; and
a first vacuum gripper located at the first outboard end;
wherein the second gripper assembly comprises:
a second linear actuator coupled to a second side of the base member, and configured to extend a second outboard end linearly in a second direction away from the second side and the first gripper assembly; and
a second vacuum gripper located at the second outboard end; and
a sensor located on the first side of the base member, and configured to measure a distance to a second surface of the workpiece; and
a controller configured to calculate a deflection of a centerline of the workpiece with respect to the common indexing line on the tooling fixtures based on the distance measured by the sensor of the tooling fixtures, to operate the first linear actuator of each of the tooling fixtures to extend the first outboard end in the first direction and bring the first vacuum gripper into contact with the second surface of the workpiece,
to apply a vacuum to the first vacuum gripper of each of the tooling fixtures to grip the second surface of the workpiece, and to reposition the workpiece on the base member of each of the tooling fixtures utilizing the first linear actuator until the deflection is less than a threshold value.

11. The tooling system of claim 10, wherein:
the controller, in response to the deflection being less than the threshold value, is configured to lock movement of the first linear actuator of each of the tooling fixtures to secure the workpiece.

12. The tooling system of claim 10, wherein:
the workpiece comprises a spar of an aircraft wing having a web that contacts the top surface of the base member, and flanges that extend from the web.

13. The tooling system of claim 10, wherein each of the tooling fixtures further comprises:
at least one variable pressure gripper along the top surface of the base member, wherein, prior to repositioning the workpiece, the controller is configured to apply a positive pressure to the at least one variable pressure gripper to form a film of air between the top surface of the base member and the first surface of the workpiece.

14. The tooling system of claim 13, wherein:
the controller, in response to the deflection being less than the threshold value, is configured to apply a vacuum to the at least one variable pressure gripper to grip the first surface of the workpiece.

15. The tooling system of claim 10, wherein:
the controller is configured to operate the second linear actuator of each of the tooling fixtures to extend the second outboard end in the second direction and bring the second vacuum gripper into contact with a third surface of the workpiece, and to apply a vacuum to the second vacuum gripper to grip the third surface of the workpiece.

16. The tooling system of claim 15, wherein:
the controller is configured to reposition the workpiece on the base member of each of the tooling fixtures utilizing the first linear actuator and the second linear actuator in combination until the deflection is less than the threshold value.

17. The tooling system of claim 10, wherein the base member of each of the tooling fixtures comprises:
an upper portion proximate to the workpiece;
a lower portion; and
at least one rail slidably coupling the upper portion to the lower portion so that the upper portion translates on the at least one rail with respect to the lower portion,
wherein the controller is configured to reposition the workpiece on the base member of each of the tooling fixtures utilizing the first linear actuator to slide the upper portion on the at least one rail until the deflection is less than the threshold value.

18. The tooling system of claim 17, wherein:
the upper portion is driven to translate on the at least one rail with respect to the lower portion when repositioning the workpiece.

19. A method of operating a tooling fixture, the method comprising:
loading a workpiece on the tooling fixture, wherein the tooling fixture comprises:
a base member having a top surface configured to support the workpiece when a first surface of the workpiece contacts the top surface;
a first gripper assembly and a second gripper assembly disposed on opposing sides of the base member;
wherein the first gripper assembly comprises:
a first linear actuator coupled to a first side of the base member, and configured to extend a first outboard end linearly in a first direction away from the first side and the second gripper assembly; and
a first vacuum gripper located at the first outboard end;
wherein the second gripper assembly comprises:
a second linear actuator coupled to a second side of the base member, and configured to extend a second outboard end linearly in a second direction away from the second side and the first gripper assembly; and
a second vacuum gripper located at the second outboard end; and
a sensor located on the first side of the base member, and configured to measure a distance to a second surface of the workpiece;
calculating an offset between an indexing position on the base member and a centerline of the workpiece based on the distance measured by the sensor;
operating the first linear actuator to extend the first outboard end in the first direction and bring the first vacuum gripper into contact with the second surface of the workpiece;
applying a vacuum to the first vacuum gripper to grip the second surface of the workpiece; and
repositioning the workpiece on the base member utilizing the first linear actuator of the first gripper assembly until the offset is less than a threshold value.

20. The method of claim 19, further comprising:
locking movement of the first linear actuator to secure the workpiece in response to the offset being less than the threshold value.

21. The method of claim 19, wherein the tooling fixture includes at least one variable pressure gripper along the top surface of the base member, and wherein prior to repositioning the workpiece, the method further comprises:
applying a positive pressure to the at least one variable pressure gripper to form a film of air between the top surface of the base member and the first surface of the workpiece.

22. The method of claim 21, further comprising:
applying a vacuum to the at least one variable pressure gripper to grip the first surface of the workpiece in response to the offset being less than the threshold value.

* * * * *